INVENTOR
Robert W. Bains
BY
ATTORNEY

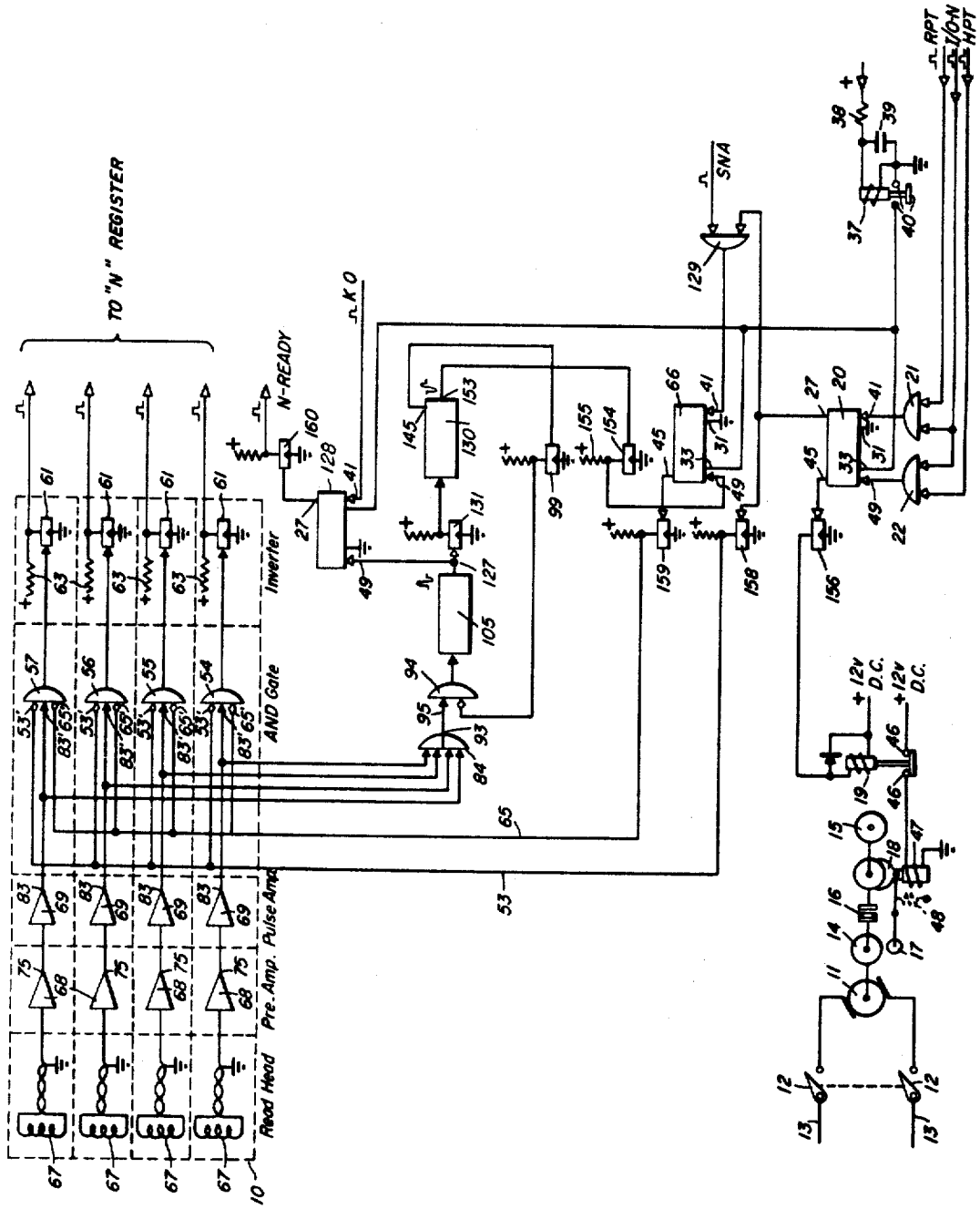

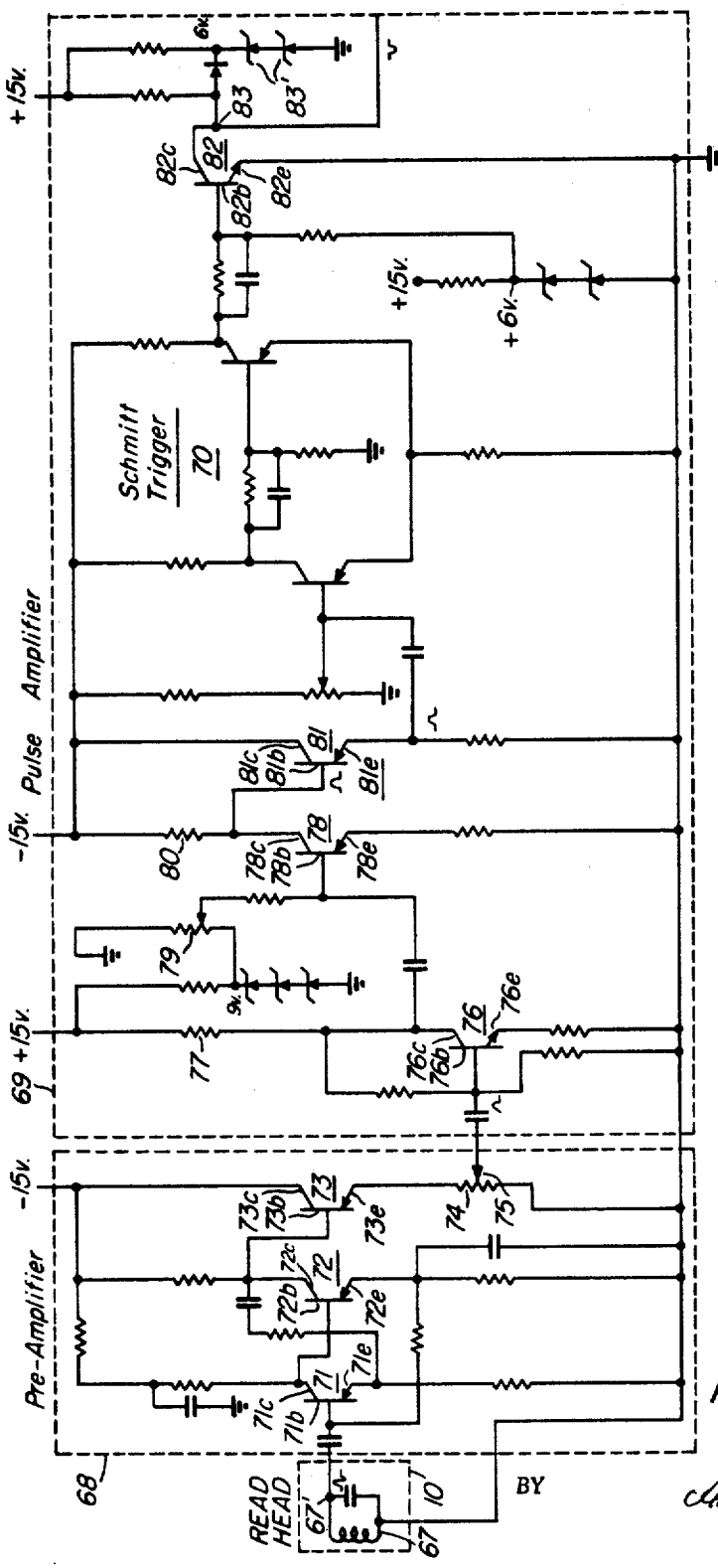
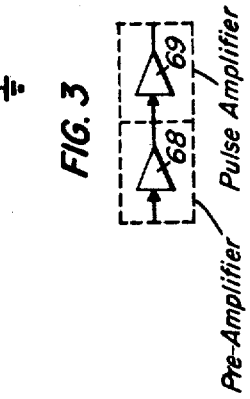

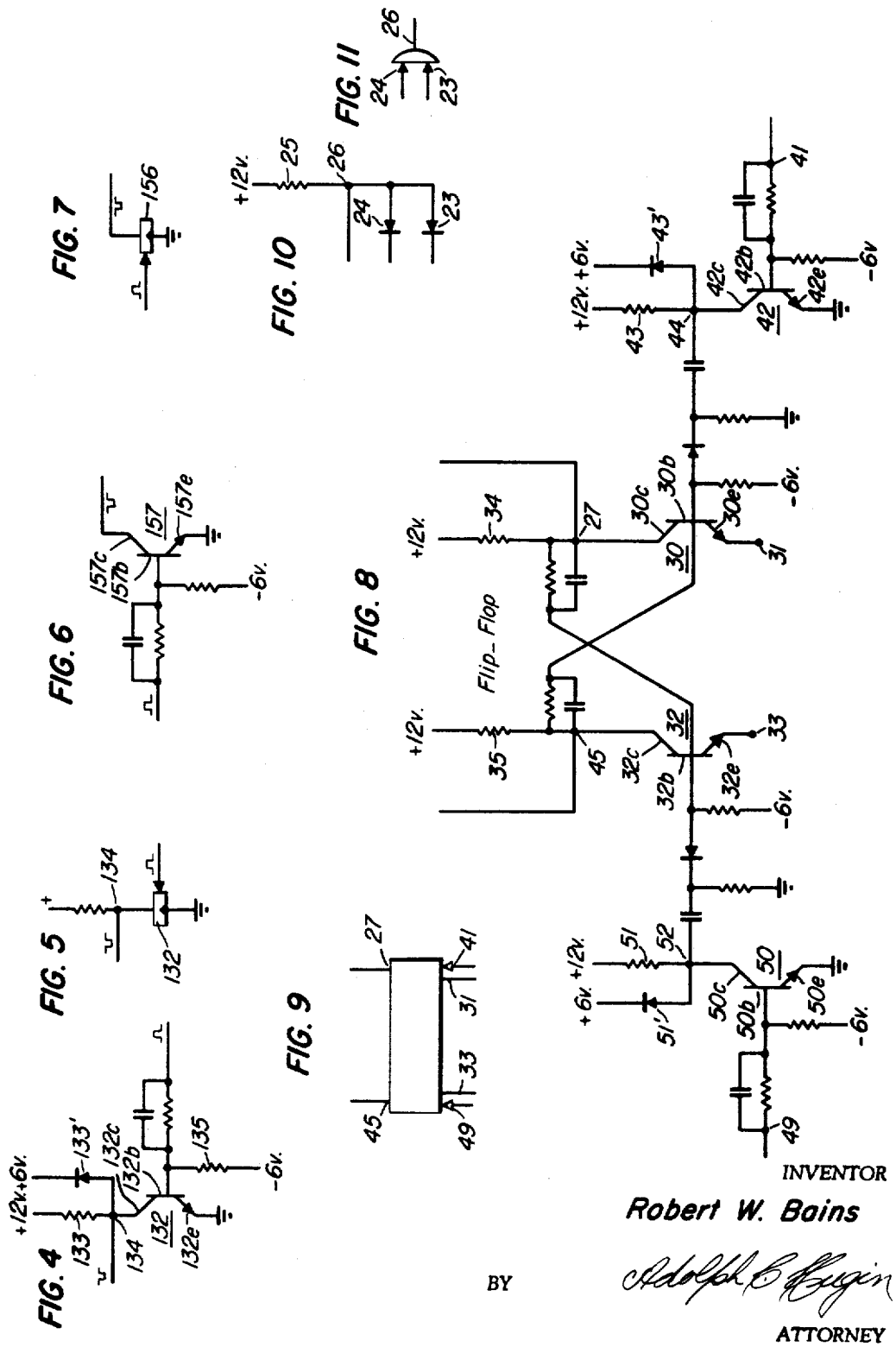

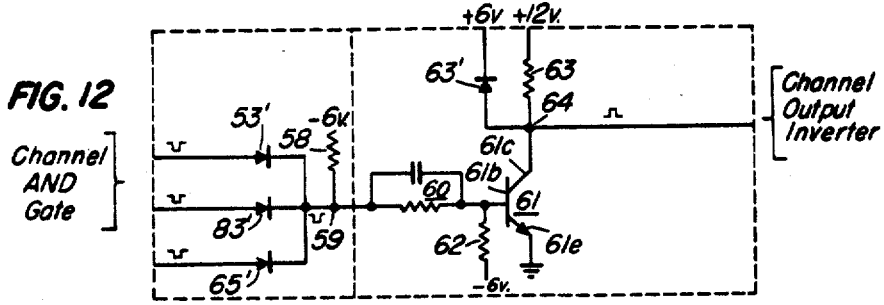
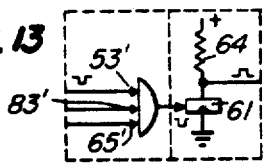
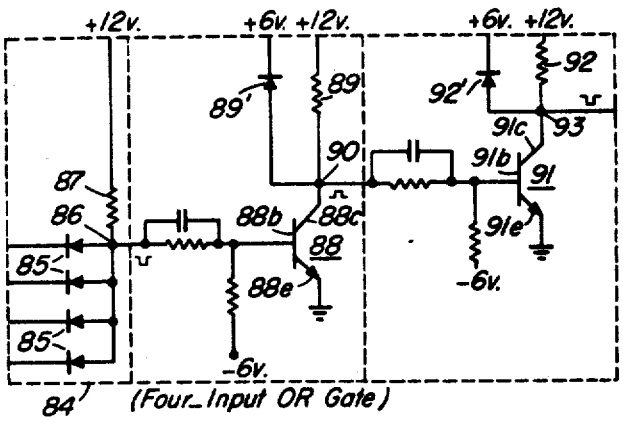
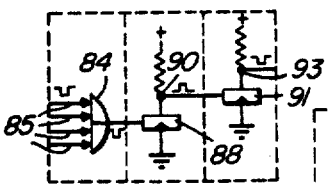
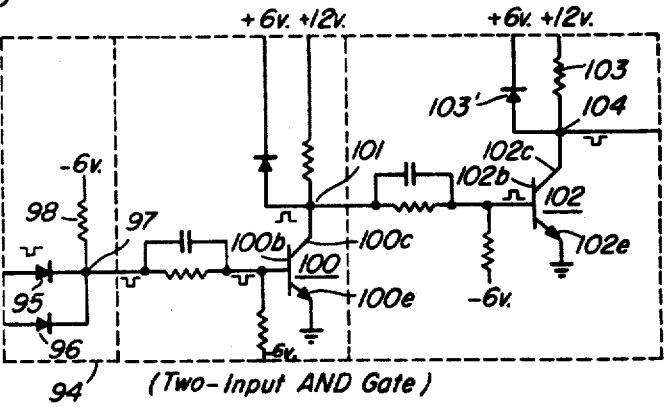

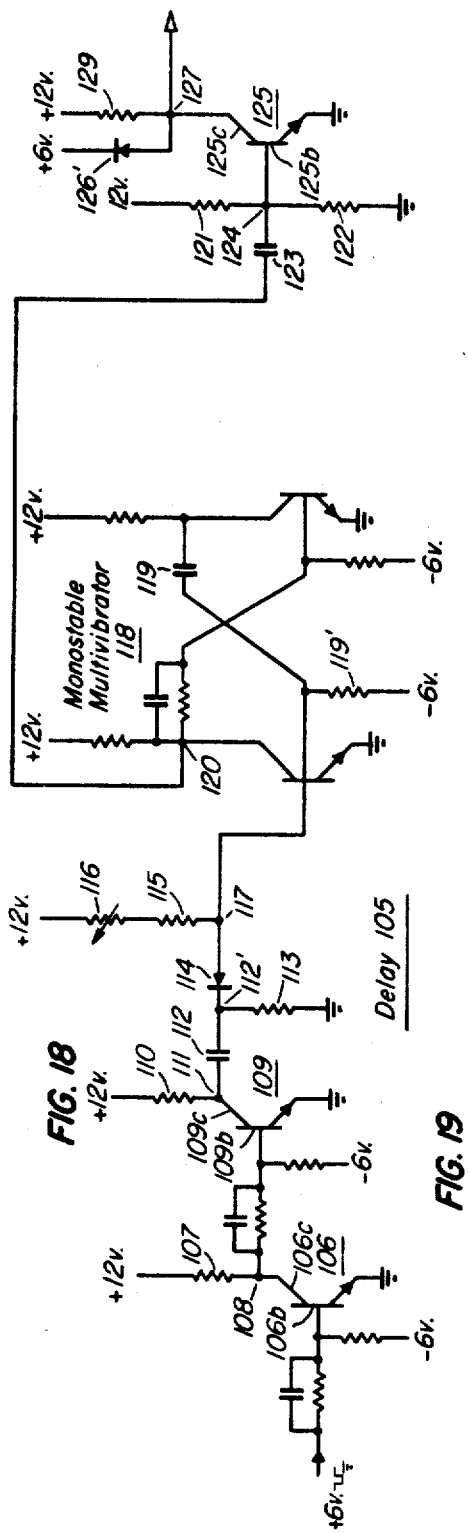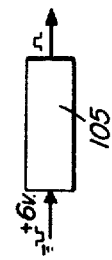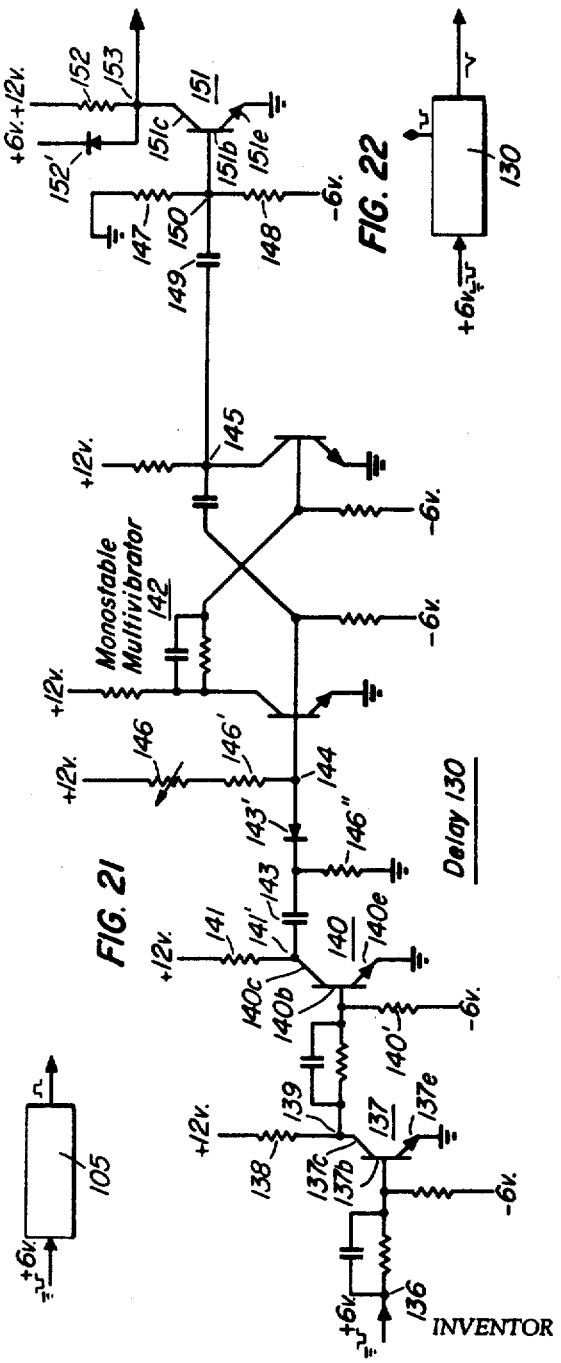

Oct. 22, 1968 R. W. BAINS 3,407,390
ELECTRONIC INTERPRETER
Filed Sept. 30, 1965 8 Sheets-Sheet 7
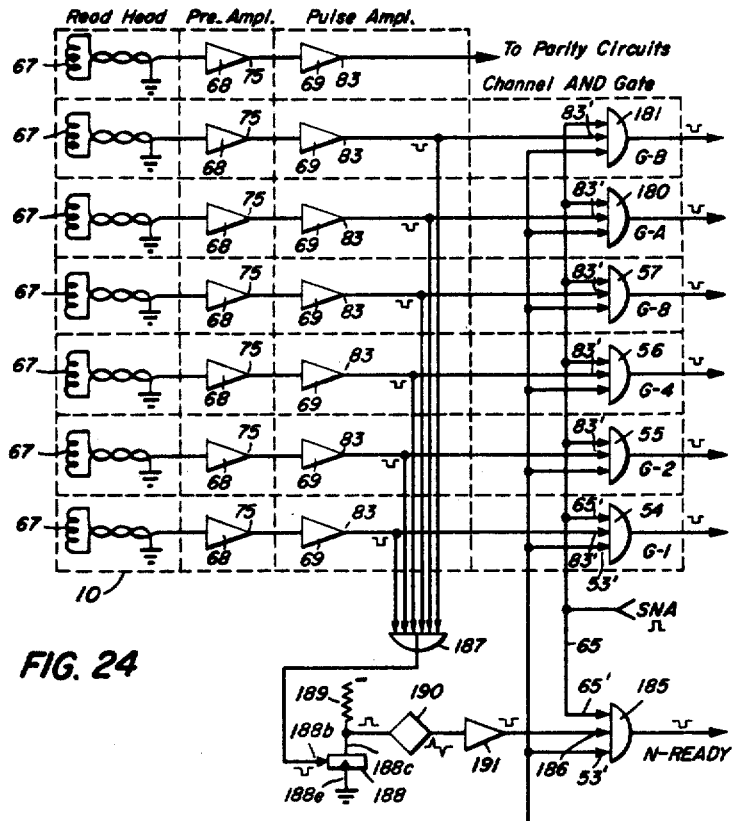
FIG. 24
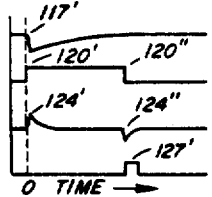
FIG. 20
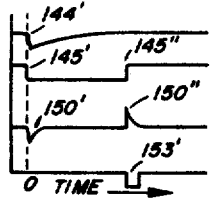
FIG. 23
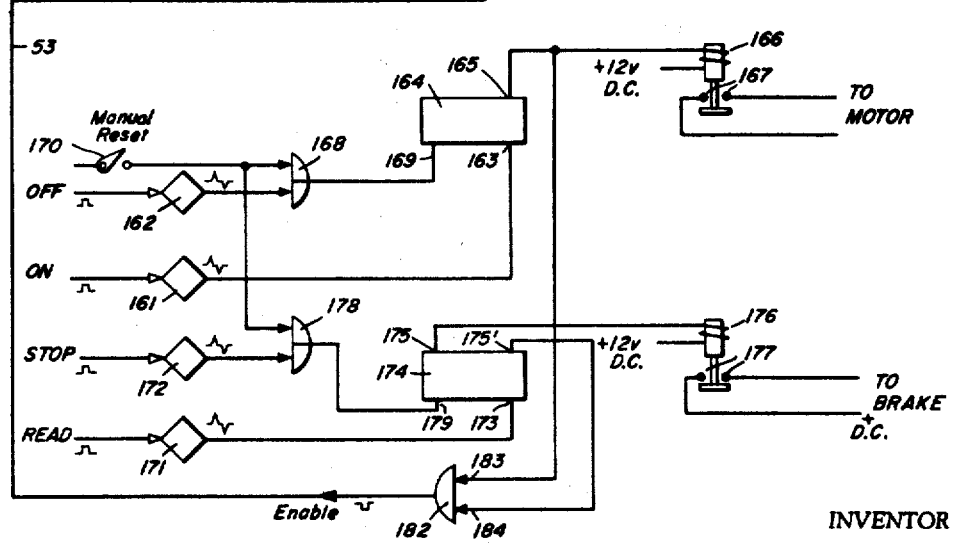
INVENTOR
Robert W. Bains
BY
*Adolph C. Hugin*
ATTORNEY

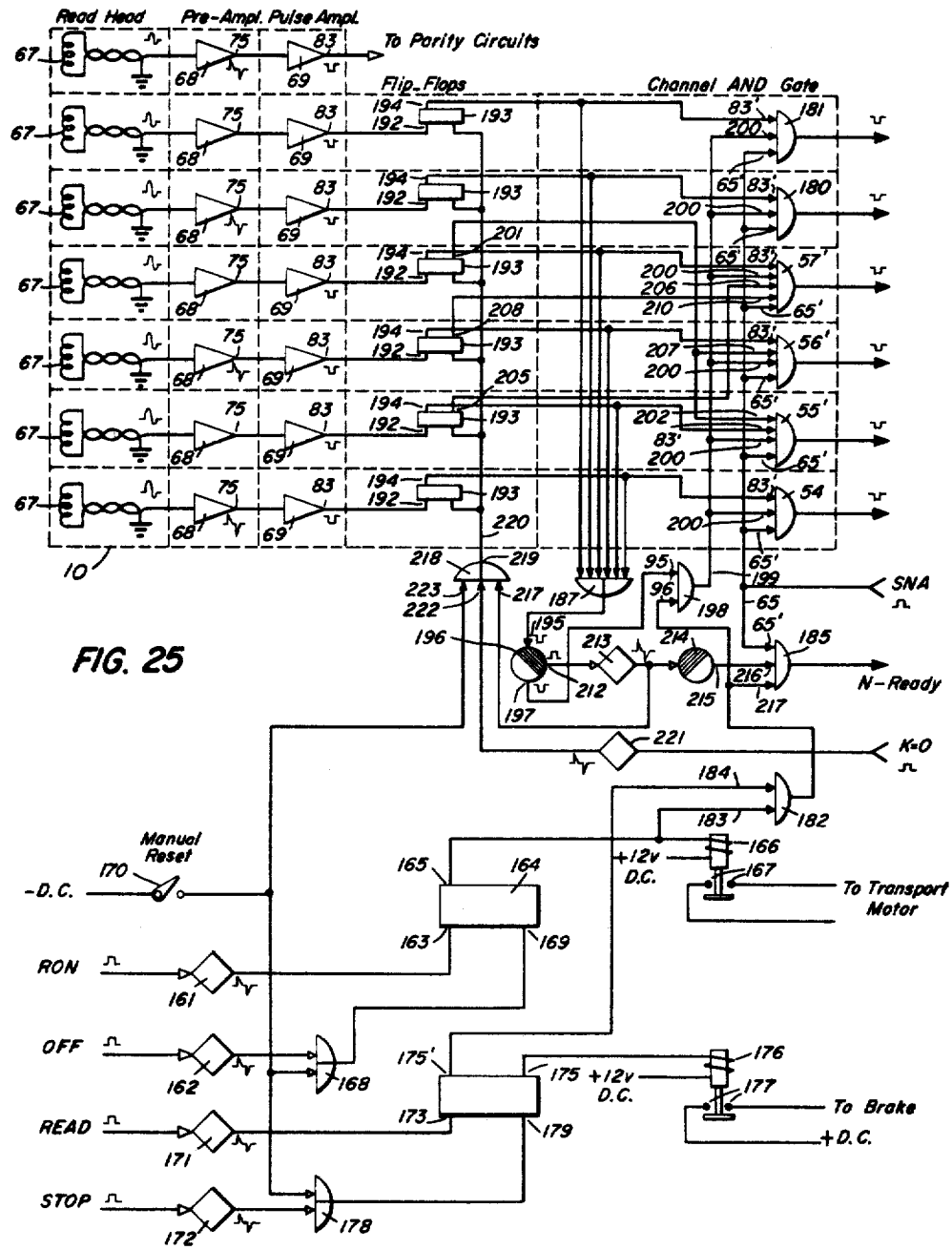

3,407,390
ELECTRONIC INTERPRETER
Robert W. Bains, Shreveport, La., assignor, by mesne assignments, to Universal Data Acquisition Company, Inc., a corporation of Texas
Filed Sept. 30, 1965, Ser. No. 491,842
27 Claims. (Cl. 340—172.5)

ABSTRACT OF THE DISCLOSURE

This application discloses an electronic data processing apparatus and more particularly a record or data interpreter for sensing information recorded on magnetic tape in one code, such as a four-channel binary coded decimal code, and either converting it into another code or retaining the same code and making it available for use by another data processing component together with certain instructions or control signals responsive to requests from the data receiving and processing equipment component.

---

In the collection and handling of masses of data, it is often convenient and desirable to be able to record and to store data by means of easily handled portable magnetic digital recorders which are simple to operate and which record on magnetic tape at relatively slow speeds. The records usually are made on small magnetic tape which gives a compact storage or memory medium. The utilization of the data thus collected frequently requires that it be rendered compatible to the receiving computer and often also that it be interpreted before it can be utilized by the processing computer. The transfer of such encoded data from a magnetic tape sometimes necessitates a translation from the code utilized on the tape to another code suitable for use by the computer or at least translated to include instructions to the computer in order to enable the computer to understand and properly process the encoded information.

The present interpreter may be considered as a code intelligence or information translation and transformation component of a complete data processing system with which such an interpreter is associated because it has the property of being able to send coded information from a suitable storage or memory medium, such as a magnetic tape, to convert and transform such coded data into acceptable input signals for a computer at the necessary electrical potential, and to provide instructions for use with a computer receptor component of the system. The interpreter and the components of the interpreter incorporating the present invention are particularly adapted to use as members of a larger data processing system or machine, but these also have distinct and separate utility, both as individual units and in combination with other data processing apparatus.

A suitable program may be written for a computer component for utilizing the output of an interpreter which recognizes various properties of the data and performs various programming functions with it in accordance with the capacities of the computers component. In its most specific aspect, this invention contemplates an electronic record interpretation apparatus adapted to sense, as by a magnetic read head, magnetic tape records inscribed in a given code, such as a modified binary code of the 1, 2, 4, 8, or 1, 2, 3, 6, type and to convert it into another code or into the same code with instructions acceptable to the data receiving and processing component. In many instances this will require the production of certain instruction signals for the processing computer component which are generated in response to certain requests received by the interpreter as signals from the computer component.

The present invention is particularly directed to this type of electronic interpreter for transcribing an encoded magnetic tape record into a multiple channel code, such as 1, 2, 4, 8, modified binary code, together with a "Ready" signal for designated computer register, such as a conventional "N" data receiving register of a General Electric 225 computer, and also to provide a complete six-channel alphanumeric code, four channels of which may be representative of the 1, 2, 4, 8 numeric code where such alphanumeric code can be processed by the computer. If desired, a parity bit circuit also can be provided, although the above-mentioned General Electric 225 computer does not utilize parity signals. The interpreter also is provided with an arrangement for inhibiting the transmittal of information from the interpreter to the computer during the time that the receiving register of the computer, such as the previously mentioned N register, is emptying or delivering its received information into the processing register of the computer, such as the A register of General Electric 225 computer. This latter condition is controlled by a signal from the computer which instructs the registers of the computer to shift the information from one register to the other. This signal may be designated the shift N to A (SNA) signal.

It should be noted that with a computer having registers N and A, such as have been previously mentioned, the computer requires an instruction or signal to let it know when the N register has been filled and is ready to transfer the information it has received to the A register. It, therefore, is necessary that a signal be sent to the computer by the interpreter to inform it of this fact. This signal may be termed an "N-Ready" signal. This latter signal must occur after the data pulses or signals for a given word, sentence, or other informational unit have had time completely to enter the N register. A convenient way of originating the N-Ready signal is to utilize the trailing edge of a designated data pulse.

In addition to the foregoing requirements for the correlation of the operation of the interpreter and computer, it is necessary that the interpreter be controllable by the request signals which the computer with which the interpreter is to operate is capable of producing. In the case of the General Electric 225 computer, these request or command signals are all based on the control of information to be supplied to the computer from a paper tape record, as this computer is designed to operate with a paper tape. These commands or requests in this computer are Reader On (RON), Read Paper Tape (RPT), Halt Paper Tape (HPT), and Off (OFF), and suitable positive pulse signals are generated in the computer and appear at designated terminals representative of these requests.

According to the present invention, the interpreter utilizes these commands or requests for controlling the operation of the computer and for formulating and supplying required instructions by the interpreter to the computer. In one embodiment, the RON and OFF command signals are used to start and stop the drive motors of the tape transport, while in another this control may be manual. The RPT and HPT commands are used to control the starting and stopping of tape movements. The "end-of-word" and the "end-of-tape" signals normally encoded on magnetic tape can not be used in some computers, such as the General Electric 225 computer, and, therefore, such signals must be blocked to prevent erroneous entries in the computer, and another method of indicating these conditions must be devised which are recognizable by the computer. Such conditions and their generation will be explained in connection with the detailed description of the embodiments of the present invention.

An object of the present invention is to provide an electronic data processing apparatus for sensing multiple channel magnetically recorded information in a suitable memory device in one code and to interpret it into another code or to transmit it in the same code with certain instructions or control signals to a data receiving and processing equipment component, all in response to requests from such a component.

Another object of the present invention is to provide an improved interpreter operable in response to commands or requests normally directed to a paper tape record reader from a data processing component for controlling the interpreter so that it will sense information encoded in a magnetic tape in a predetermined code and will thereupon respond to these commands or requests and interpret the sensed data into a code compatible to the computer and generate and transmit instructions with the compatible code data to the computer to enable the computer properly to process the transmitted data.

Further objects and advantages of this invention will become apparent from the following description referring to the accompanying drawings and features of novelty which characterize this invention will be pointed out with particularity in the claims appended to and forming a part of this specification.

In the drawings:

FIG. 1a is another schematic logic diagram, very similar to FIG. 1, with only slight variations in certain circuits more readily enabling the use of conventional prefabricated circuit components;

FIG. 2 is a schematic circuit diagram illustrating detailed circuitry of a read head, pre-amplifier, and pulse amplifier suitable for use in interpreters such as those shown in FIGS. 1, 1a, 24 and 25, wherein these three units are marked off in dotted lines corresponding to similarly marked off dotted line sections in FIGS. 1, 1a, 24, and 25;

FIG. 3 illustrates the schematic symbols used in the logic diagrams to represent the pre-amplifier and pulse amplifier in each channel of the system;

FIG. 4 is a schematic circuit diagram of an NPN transistor clamped inverter usable in interpreters embodying this invention;

FIG. 5 is a simplified schematic logic diagram of the inverter shown in FIG. 4;

FIG. 6 is a schematic circuit diagram showing circuit details of another inverter of a type used in the system shown in FIG. 10, comprising an unclamped NPN transistor, with a negatively biased base;

FIG. 7 is a simplified schematic logic diagram of the inverter shown in FIG. 6;

FIG. 8 is a schematic circuit diagram illustrating a binary suitable for the systems of FIGS. 1, 1a, 24, and 25;

FIG. 9 is a simplified schematic logic diagram of the binary shown in FIG. 8;

FIG. 10 is a schematic circuit diagram of a two-input AND gate suitable for the systems shown in FIGS. 1, 1a, 24 and 25;

FIG. 11 is a simplified schematic logic diagram of the AND gate shown in FIG. 10;

FIG. 12 is a schematic circuit diagram illustrating an AND gate suitable for each channel of the systems shown in FIGS. 1, 1a, and 24, together with an associated inverter in each of these channels;

FIG. 13 illustrates the simplified schematic logic representation of the two circuit units shown in FIG. 12;

FIG. 14 is a schematic circuit diagram of an OR gate and its associated inverters which are suitable for reception of an input signal from the pulse amplifier of each channel of systems such as those shown in FIGS. 1, 1a, 24, and 25;

FIG. 15 is a simplified schematic logic representation of the OR gate and the two associated inverters shown in detail in FIG. 14;

FIG. 16 is a schematic circuit diagram illustrating an AND gate which is adapted to receive one of its input signals from the OR gate shown in FIGS. 9 and 10 in systems such as those shown in FIGS. 1 and 1a;

FIG. 17 is a simplified schematic logic diagram of the AND gate and its associated inverters shown in FIG. 16;

FIG. 18 is a schematic circuit diagram of a delay unit connected to the output of the AND gate of FIGS. 16 and 17 in systems such as those of FIGS. 1 and 1a;

FIG. 19 is a simplified schematic logic diagram of the delay unit shown in FIG. 18;

FIG. 20 represents signal pulse transmissions through the delay unit of FIG. 18.

FIG. 21 is a schematic circuit diagram illustrating a second delay unit which is adapted to receive an output signal from the first delay unit in the systems shown in FIGS. 1 and 1a;

FIG. 22 is a simplified schematic logic representation of the delay circuitry of FIG. 21;

FIG. 23 is a graphic representation of the relative pulses at different points in the delay circuit FIG. 21;

FIG. 24 is a schematic logic diagram illustrating another embodiment of the present invention utilizing various units similar to those of FIG. 1; and FIG. 25 is a schematic logic diagram illustrating a further embodiment of the present invention.

Figure 1:
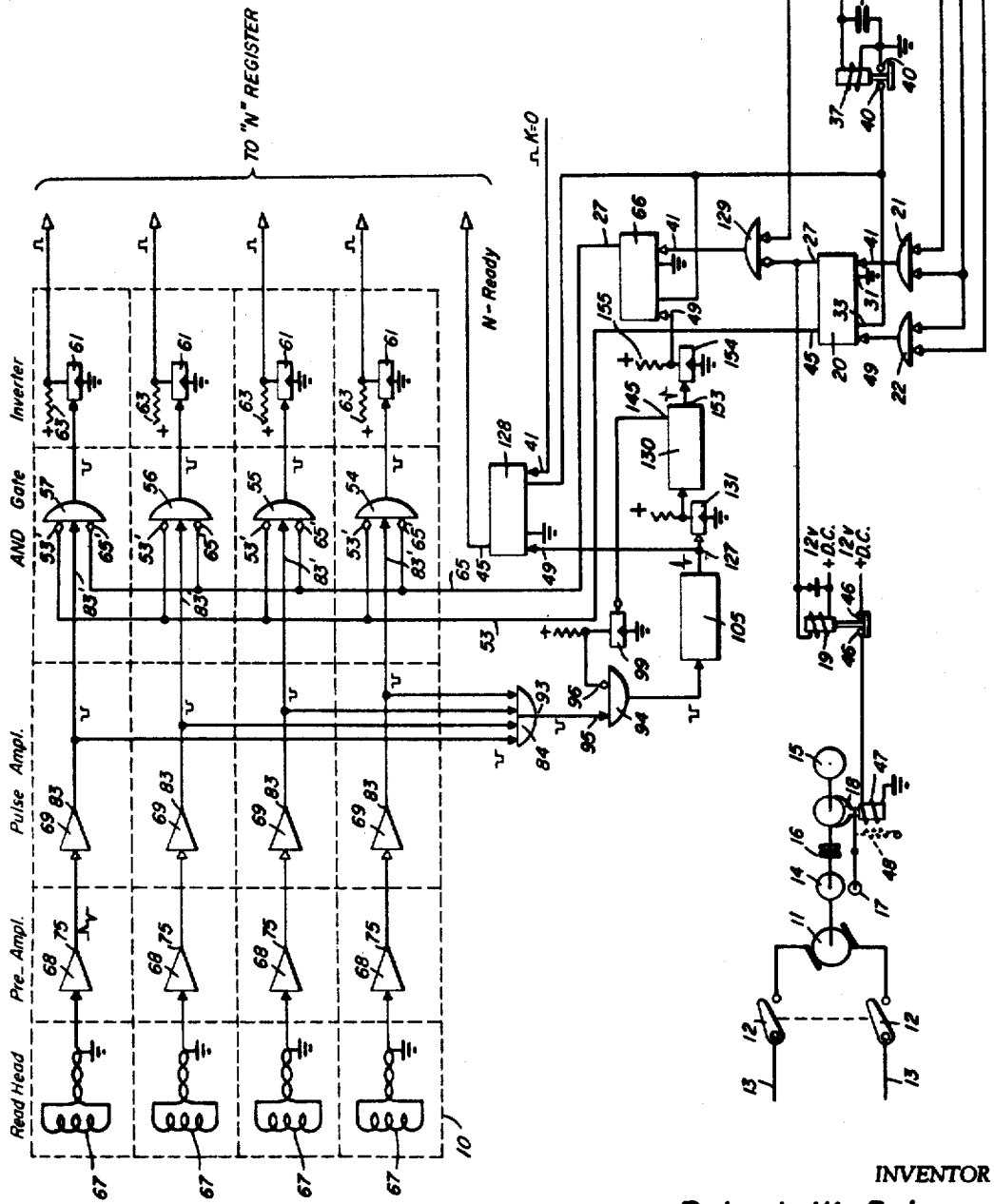
FIG. 1 is schematic logic diagram illustrating an electronic interpreter embodying the present invention.

Referring to the drawings, an embodiment of the present invention is illustrated in FIGS. 1 through 23 which is particularly useful as an electronic code interpreter for reading relatively small tape, such as quarter-inch magnetic tape, on which information data may have been recorded by a suitable magnetic recorder and supplying it as coded electrical input with instructions compatible to a computer with which it is designed to operate. The interpreter illustrated in these figures is adapted to read a four-level or four-channel code, suitably amplify, and, where desirable, make conversions into another code compatible with the input requirements of a computer to which the information is to be supplied for processing, and to suppress any instructions recorded on the tape which are not useable by the associated computer, while generating and supplying to the computer instruction which will enable the computer properly to process the transmitted data. The operation of the interpreter is made responsive to commands or requests from the computer, which are generated by circuits conventional to the computer to which the interpreter is adapted to supply the information and instruction signals.

In order to provide a specific illustration of the present invention, the system shown in these figures will be described for an interpreter which is adapted to read a four-channel magnetic tape encoded in a 1, 2, 4, 8 binary coded decimal code and to supply the input requirements to a computer adapted to receive the same type binary coded decimal code together with specific instructions required by the computer in order to transmit the coded information from a computer receiving register to another computer register. More specifically the illustrated interpreter is adapted to provide data information compatible to the receiver of a GE-225 computer. Such a computer is provided with a receiving register, designated as an N register, which is a six-bit or six-channel register used as a single character temporary storage device. This receiving register is not part of the present invention and is a conventional part of a GE-225 computer. It is adapted normally to function between the computer and associated peripheral apparatus, such as a console typewriter, a paper tape reader, or a paper tape punch.

In this type of computer, after a single character has been completely entered into the N register, it is adapted to be shifted to another computer register known as the A register. This also does not form any part of the present invention and is mentioned simply in order to facilitate the understanding of the operation of the interpreter. The N register consists of six binaries or flip-flops which may be set to indicate the presence of data in the six respective channels. In the case of the reading of magnetic tape, this would indicate the presence of a bit on the magnetic tape record. Information may be transferred internally in the computer directly between the N register and the A register by proper shift commands or instructions as required by the computer program.

The N register of the computer has certain input requirements which must be met by the output of the interpreter. One of these requirements is that the electrical potential levels of the data input signals be sufficient to set the binaries in the register. These signals also must not be transmitted to the N register except when the N register is in condition properly to receive such signals. It is, therefore, necessary for the interpreter to be instructed by the computer when the N register is capable of receiving information and for the interpreter to accept such requests or commands from the computer to control the reading of the magnetically recorded information and to transmit it to the N register as efficiently as possible and at a suitable potential. Furthermore, the computer requires an instruction which will inform it that a complete character has been entered into the N register and that the N register is in condition, ready to transmit this single complete character to the A register. For purposes of simplicity, this instruction will be designated in the explanation of the present interpreter as the "N-Ready" signal.

In addition to the foregoing general features of the interpreter, it is necessary that the interpreter be adapted to transport and read the magnetic tape in response to conventional paper tape control or command signals generated by the computer. In the system illustrated in FIGS. 1–23, the tape transport is adapted to be operated by an electric motor which is manually controlled, so that it is either turned on continuously while the interpreter is in operable condition or off when the interpreter is not in use. The transport of the tape in readable relation past a read head is controlled by the operation of a brake which is arranged to stop or release a tape take up reel and concurrently to release or apply a pressure roller which biases the tape into driving engagement with a tape advancing capstan so as to move the tape past the read head only when the computer requests additional information.

The release of the transport brake and application of the pressure roller is responsive to a READ PAPER TAPE, command from the computer, and the application of the brake and release of the pressure roller to stop movement of the magnetic tape past the read head is responsive to a HALT PAPER TAPE command from the computer. These two transport control commands are indicated in the drawings and will be referred to hereafter respectively as the RPT and HPT commands or signals, or simply the READ and STOP commands. In an interpreter such as that shown in the drawings, the necessary equipment for moving magnetic tape across a multiple track read head at the proper speed and for starting and stopping the tape movement, while carrying out all other necessary spooling and reeling operations, may comprise any suitable tape transport, such as that shown in Patent 2,828,961—Rehklau, provided with a suitable brake and pressure roller for controlling the tape drive as has been explained. A detailed disclosure of such a tape drive also is given in copending application Ser. No. 293,956, Bains et al., filed July 10, 1963, and assigned to the same assignee as the present application.

In reading conventional magnetic tape by an interpreter such as those illustrated, a magnetic tape reading speed of about 30 inches per second will usually be found to be acceptable for most programming of a GE–225 computer. With such a speed of movement of magnetic tape across a conventional read head, several millivolts will be generated in the respective read head units by a record bit in the tape. This potential is not sufficient to produce the necessary output signals for operating the remainder of the interpreter and provide the necessary input signals to the computer data processing component. It is, therefore, necessary that an electric pulse induced in the read head by recordings in the magnetic tape be suitably amplified before being processed through the interpreter control circuits and emitted as an interpreter output signal.

Referring to FIG. 1, a tape transport is schematically shown for moving magnetic tape past a multiple-channel read head 10 of the interpreter. This tape transport comprises an electric drive motor 11 which is adapted to be manually controlled by a suitable switch 12 for connecting and disconnecting the motor 11 to a suitable source of electrical power 13. This motor 11 is adapted to drive a tape driving capstan 14 to which it is directly mechanically connected in any suitable manner, and also to drive a tape take-up reel 15 through a suitable slip clutch 16. A convenient drive of this type is disclosed in detail in the previously mentioned copending patent application.

The read head 10 will read magnetically encoded data in the tape as it is moved in reading relation across the read head, and, since the computer is not adapted continuously to receive information, it is necessary that the encoded information be delivered intermittently to the computer receiving register N in accordance with the receptive conditions of the computer. The tape transport motor 11 normally continues to run, once started, even though the tape may not be moved continuously across the read head. During usual operation, the tape is fed continuously in reading relation across the read head 10, in spite of the intermittent feeding of the information to the computer from the interpreter. The reason this is possible is that the conventional longitudinal spacing of data bits in magnetic tape is sufficient to allow for the production of the necessary output data signals by the interpreter and for the computer to receive these signals and transmit them for processing by the computer without interference between successive data signals. Suitable precautionary delays and stray or interfering signals inhibiting means are provided in the interpreter to prevent the transmittal of spurious signals from the interpreter to the computer during the time when no such signals should be present, as during the time data is being shifted from the N register to the A register of the computer. Thus, the tape transport motor is continuously operable as long as the manual switch 12 is closed, and it is operable to drive the tape from the time the computer requests a reading by its RPT command signal.

In order to transport tape in reading relation across the read head, it is concurrently advanced by being resiliently biased into driving engagement with the rotating capstan 14 by a pressure roller 17 and reeled up on the take-up reel 15. This action is readily obtained by releasing the brake 18, so that the reel is driven through the clutch 16 and simultaneously the pressure roller 17 is moved through a suitable linkage into tape driving position. The brake 18 preferably is of the electromagnetic type, and its electrical energization may conveniently be provided by a suitable source of power, such as a 12-volt direct current source. The brake is adapted to be connected to the energizing source by any suitable circuit breaker, such as relay 19, which is normally energized when the brake 18 is adapted to be applied for stopping the take-up reel 15. Application of the brake 18 concurrently moves the pressure roller 17 away from the capstan, and release of the brake simultaneously move the pressure roller toward the capstan so as to press the tape into driving engagement with the capstan.

The control of the brake 18 to provide the desired tape drive may conveniently be obtained in response to the RPT and HPT signals which are conventional GE–225 computer, command signals. This is obtained by controlling the energization of relay 19 through any suitable binary 20, the bistable conditions of which are adapted to be determined by a pair of two-input AND gates 21 and 22, the output of each of which is connected to a different input of the binary 20. Details of suitable gates and a suitable binary for this purpose are schematically represented respectively in FIGS. 10 and 11 and 8 and 9. Such AND gates may each comprise two diodes 23 and 24, FIG. 10, having the anodes thereof in parallel and connected to a biasing voltage, such as a positive 12-volt D.C. source, through a suitable load resistor 25 and having an output terminal 26 at the connection of the resistor to the diodes. The cathodes of the diodes 23 and 24 form the inputs to the gate. With such a gate, if either or both of the inputs (cathodes) is negative, current flows through the load resistor 25, and the gate output 26 is at a potential lower than the biasing voltage. If both of the inputs (cathodes) are suitably raised in potential, as by positive pulses or voltages, the current flow is substantially cut off. This causes a rise in voltage at the output 26 which may be considered as positive output pulse. For further simplicity, this type AND gate may be schematically represented as shown in FIG. 11, and this is the symbol used in the logic diagrams of FIGS. 1, 1a, 24, and 25.

In FIG. 1, one of the inputs of both of the AND gates 21 and 22 is connected to receive an instruction signal from the computer which is designated as an Input-Output-N (I/O-N) signal. This signal indicates when the N register of the computer has been cleared. When it is desired to have data transmitted to the N register of the computer, the computer emits an RPT signal, and this is impressed as the second positive pulse input to the AND gate 21. All of the command signals from the GE-225 computer component are in the nature of positive electric pulses. When the AND gate 21 receives a positive input pulse on each gate diode, it will transmit a positive pulse from its output to its input to the binary 20.

All of the binaries in this interpreter system are essentially the same. The input terminals may be connected differently in the different binaries in order to obtain the desired set and reset conditions for the desired outputs; that is, the terminal which is connected to one of the flip-flop input transistors which is permanently grounded and the reset terminal which is connected to the other flip-flop input transistor are varied in accordance with the available inputs to the respective binaries and the respectively desired outputs therefrom. All of these may comprise circuits and circuit elements as shown in FIG. 8 and represented for simplicity by the symbol of FIG. 9.

Binary 20 is of the type shown in FIG. 8 wherein the emitter 30e of one of the flip-flop input transistors 30 is permanently grounded by grounding the binary input terminal 31, FIG. 1. The emitter 32e of the other flip-flop input transistor 32 is connected to the binary input terminal 33 which is connected to the reset circuit of the interpreter system. The flip-flop as such, in the binary shown in FIG. 8, actually comprises the two input transistors 30 and 32, together with the interconnections of the various components of these transistors to each other and to suitable biasing voltages through voltage divider resistance networks and condensers. The initial condition of the flip-flop is obtained in each instance by the imposition of biasing voltages on the inverter collectors 30c and 32c of the input transistors 30 and 32, respectively. In the illustrated flip-flop, the two input transistors are of the NPN type, and the collector biasing voltages may be any suitable value, such as from a positive 12-volt D.C. source. Initially when the interpreter is turned ON for normal use, this 12-volt D.C. voltage is applied on closure of the main starting switch. Thus, the flip-flop input transistor collectors 30c and 32c are initially both biased substantially to a positive 12 volts through resistors 34 and 35, respectively. Due to the interconnections, a 12-volt positive bias is impressed on the bases 30b and 32b, respectively, of the flip-flop input transistors 30 and 32, and with the emitter 30e permanently grounded and the emitter 32e initially open-circuited through the terminal 33, the transistor 30 is turned ON. This results in current flow through transistor 30 and the resistance 34 which is connected to collector 30c. This causes a voltage drop in the resistance 34, such that the flip-flop output terminal 27 between the resistance 34 and the transistor 30 is at a lower voltage than formerly, and this lower voltage is impressed on the base 32b of the other flip-flop transistor 32, thereby assuring that this transistor, which has not yet been turned ON, remains turned OFF.

As shown in FIG. 1, the flip-flop input terminal 33 is connected to the reset circuit of the interpreter and is adapted to be grounded through a reset relay 37. This relay 37 is adapted to be energized by any suitable direct current source, and is connected to an energizing source concurrently with the energization of the entire interpreter system on closure of the main starting switch. The coil of the relay 37 is connected to a direct current source through a capacitance-resistance delay circuit, including a suitable series-connected resistance 38 and a suitable parallel-connected capacitor 39 to provide a predetermined time delay in the energization of the relay coil. This, together with the inherent slower response of a mechanically operated device as compared to the response of the electronic components of the system, results in a grounding of the transistor emitter 32e through relay contacts 40 subsequent to the previously described energization of the elements of the transistor 30 which turned ON this latter transistor and lowered the voltage on the transistor base 32b. The result is that the transistor 32 remains turned OFF, even though its emitter 32e has been grounded through the contacts 40 of the reset relay 37.

FIG. 8 type binary, each of the flip-flop transistors 30 and 32 is controlled through an input transistor circuit to which a second binary input terminal is connected. In the illustrated arrangement, the impression of a positive pulse on one binary input terminal 41 of these second terminals results in a positive pulse on the base 42b of an NPN transistor 42. The emitter 42e of this transistor is permanently grounded and the collector 42c is connected through a suitable load resistance 43 to a biasing voltage, such as a positive 12-volt D.C. source and clamped through a suitable diode 43' to a clamping voltage, such as a positive 6-volt D.C. source. Current can thus flow from the +12-volt source through the resistance 43 and the diode 43' to the +6-volt clamping voltage, and the connection point 44 will be clamped to substantially +6-volts. The result of such a positive input pulse on terminal 41 is that the transistor 42 is thereby turned ON, so that current flows through the transistor 42 and its load resistance 43. This produces a drop in voltage across the resistance 43, such that the voltage at an output terminal 44 between the resistance 43 and the transistor 42 is lowered below the +6-volt clamping value. The diode 43' prevents a reverse flow of current from the +6-volt clamping voltage. This lowered voltage is in the nature of a negative pulse which is impressed upon the base 30b of the transistor 30, thereby turning OFF this flip-flop input transistor, which results substantially in a cessation of current flow through the flip-flop load resistance 34. This produces a restoration of the voltage on the flip-flop output terminal 27 to substantially the full 12-volt bias voltage. As a result, this produces a positive or high level potential on this flip-flop output terminal 27 in response to the impression of a positive pulse on the binary input terminal 41.

It should be noted that, as in any conventional flip-flop, the higher voltage produced on the binary output terminal 27 is impressed on the interconnected flip-flop input transistor base 32b. This results in turning ON the transistor 32, so that current flows through this transistor from its supply voltage to ground, and, in doing so, passes through a load resistor 35, thereby producing a voltage drop across this resistance, which in turn, results in a drop in voltage on the flip-flop output terminal 45 between the resistor 35 and the collector 32c.

As in any conventional flip-flop, this drop in voltage is impressed on the base 30b of the interconnected flip-flop input transistor 30, thereby assuring the stable maintenance of this input transistor in its OFF condition until it is triggered ON as previously explained. The lower voltage on the flip-flop output terminal 45 also can be used for controlling other parts of the interpreter circuit as will be indicated later.

As shown in FIGS. 1–10, when the two-input diode gate 21 is turned ON by computer output signals RPT and I/O–N, a positive pulse is impressed on the binary input terminal 41 of the binary 20, with the result that its flip-flop terminal 27 goes to a positive or high level potential, which is impressed on the coil of the relay 19 in opposition to the D.C. voltage thereon. This deenergizes the relay coil and causes the relay to open its contacts 46, which deenergizes the brake operating coil 47 of the electromagnetic brake 18. This releases the brake 18 and permits the take-up reel 15 to revolve, and concurrently the pressure roll 17 is resiliently biased, as by a spring 48, toward the capstan 14 to press the magnetic tape into driving engagement with the capstan 14, thereby advancing it in reading relation across the read head 10. Thus, whenever the computer emits a request for a reading, the magnetic tape is operated so as to be read by the read head, and it is fed continuously across the read head until the computer issues an HPT signal or the main transport switch 12 is opened.

When the computer requests a cessation of the reading of the tape, the conventional GE–225 computer emits an HPT signal. As shown in FIG. 1, this HPT signal is impressed as an input to one of the diodes of AND gate 22 and the I/O–N signal is impressed on the other diode input of gate 22. This produces a positive pulse output from gate 22 which is impressed on terminal 49 of binary 20. This positive pulse overcomes the negative 6-volt bias on base 50b of input transistor 50 and turns ON this transistor, thereby causing current to flow from the +12-volt biasing voltage through a load resistor 51 to ground. This produces a voltage drop across the resistor 51 which results in a fall in voltage at the transistor output terminal 52 to substantially ground potential which is impressed on the flip-flop transistor base 32b thereby turning OFF transistor 32. The diode 51' prevents reverse flow of current from the +6-volt clamping voltage through the resistor 50. When transistor 32 is thus turned OFF the flow of current through the resistor 35 substantially stops, so that the flip-flop terminal 45 is restored to substantially the +12-volts of the supply voltage. As in the former instance, this positive pulse is impressed on the other flip-flop inverter base 30b and turns ON this inverter and maintains it in a stable condition until opposite input signals are received. The result is that the voltage at the flip-flop terminal 27 is lowered and it goes to a negative or low level potential.

The appearance of a negative or low level voltage on terminal 27 permits energization of the relay 19, so that its contacts 46 are closed, thereby energizing coil 47 of the brake 18. This applies brake 18 so as to stop the take-up reel 15 and concurrently retracts pressure roller 17 from the capstan 14, so that the tape no longer is biased into driving relation with the capstan. Thus, when the computer emits as request to HALT the tape, the tape transport drive is made inoperative for tape advance.

As has been explained, when the interpreter is turned ON and the computer requests the interpreter to start operation and emits an RPT signal, the binary 20 output terminal 45 is placed at a low level potential. This low level potential is impressed on an enable circuit 53 which is connected to one input 53' of each of the three-input channel AND gates 54, 55, 56, and 57. Each of these channel AND gates may comprise a three-diode gate, such as that shown in detail in FIG. 12 and represented symbolically in simplified form in FIG. 13. As shown in FIG. 12, if any of the inputs to the diodes is at a high level or ground potential, current will flow through the diode and through the load resistance 58 which is connected to a suitable negative potential, such as a −6-volt D.C. source. Under these conditions the output terminal 59 of the gate will be at the high level or ground potential.

The high level potential will be transmitted through a capacitance-resistance network 60 to the base 61b of a channel inverter 61 and thereby overcomes the negative bias on the base of this transistor which is impressed thereon through a suitable biasing resistance 62 from a suitable negative potential, such as a −6-volt D.C. source. The transistor collector 61c is connected to a supply voltage, such as a +12-volt D.C. source, through a load resistor 63 and to a clamping voltage, such as a +6-volt D.C. source through a diode 63'. The high level potential impressed on the inverter base 61b turns ON the inverter 61, so that current will flow therethrough to ground from its supply voltage through the load resistor 63 results in a drop in voltage thereacross such that the output terminal 64 of the channel inverter 61 is placed at a lower voltage and is reduced substantially to ground potential through the transistor 61. The diode 63' prevents reverse flow of current from the clamping voltage and thus allows terminal 64 to go to ground potential.

At any time that a negative potential or negative pulse is impressed on all three of the diodes of a channel AND gate, no current will pass through such a gate and its output terminal 59 will be lowered to substantially the −6-volts of the load voltage impressed on the load resistance 58. When this occurs, the channel transistor base 61b is placed at a negative potential which thereby effectively turns OFF the channel transistor 61, such that substantially no current flows through the transistor collector 61c. This results in a rise in potential on the channel transistor output terminal 64 to substantially the +6-volts clamping potential and produce a positive output pulse on the line connected to this channel terminal 64.

A second enabling circuit 65 is connected to another input diode 65' of each of the channel AND gates. This enabling circuit is connected to an output terminal 27 of a second binary 66, which is of the same type as binary 20 and may comprise the same details as those shown in FIGS. 8 and 9. Corresponding terminals of binary 66 will be indicated by the same reference numerals as those of binary 20, since the terminal elements and circuitry and the operation of binary 66 is the same as that of binary 20. As has been explained with reference to binary 20, when the interpreter is initially turned ON, the output terminal 27 of the binary is placed at a low or negative potential. This low voltage is transmitted by the enabling circuit 65 to the channel AND gates and is impressed upon the input diode 65' of each gate. Thus, two of the requirements of the inputs for all of the channel AND gates are satisfied for the emission of a positive pulse from each respective channel inverter.

The third input to each of these channel AND gates is connected to a respective read head coil 67 through a suitable amplifier. FIG. 2 illustrates details of a suitable read head and amplifier for each channel of the interpreter. As shown in this figure, each read head coil 67 is adapted to read data encoded and recorded on magnetic tape by having induced therein an electrical voltage whenever a record bit in the respective magnetic tape channel passes in reading relation to a read head coil 67. This induced voltage appears on the terminal 67' of the read head 10 and is connected to a preamplifier 68 which may comprise suitably interconnected transistors so as to supply a reasonably amplified pulse to a pulse amplifier 69. The preamplifier may be of any suitable type such as that described in "Pulse and Digital Circuits" by Millman and Taub, McGraw-Hill Book Co., Inc., 1956, Chapter 18, p. 573. Such a transistorized preamplifier is illustrated at 68 in FIG. 2. The specific detailed circuitry of this preamplifier does not form part of this invention and, therefore, will not be explained, as it is well known in the art. The output of this preamplifier is adapted to be amplified further by the pulse amplifier 69 which includes a conventional type Schmitt trigger 70.

In general, the output pulse from the read head coil 67 will be a positive pulse induced by the leading edge of a data bit. This will be impressed on the base 71b of PNP transistor 71 with the result that it will be turned OFF. This will restore its collector 71c substantially to its −15 volt bias and impress it as an amplified negative pulse on the base 72b of a second PNP transistor 72. As a result, transistor 72 is turned ON and its collector 72c is brought substantially to ground potential from substantially −15 volt. This produces an amplified positive pulse which is impressed on the base 73b of another PNP transistor 73, and in turn turns OFF this transistor, so that current flow therethrough is substantially stopped. Its emitter 73e is connected through a potentiometer 74 to ground, with the result that when current ceases to flow through transistor 73, the output terminal 75 of the potentiometer is raised substantially to ground potential. This terminal is also the pre-amplifier output terminal.

This positive rise in voltage is impressed on the base 76b of an input NPN transistor 76 of the pulse amplifier 69 and turns it ON. This results in a current flow with a consequent voltage drop through a resistor 77, such that a negative pulse is impressed on the base 78b of PNP transistor 78. This base 78b is normally biased positively through a potentiometer 79 which is set so as to determine the voltage required on the base 78b to turn ON the transistor. This minimizes false signals from spurious sources producing effects in the data channels. When transistor 78 is turned ON, current flows through a resistor 80 connected to the collector 78c, which causes a potential change thereacross such that the collector 78c will be at a higher voltage. This rise in voltage is impressed on the base 81b of PNP transistor 81, thereby shutting OFF this transistor. This produces a rise in voltage on the emitter 81e which is the input voltage to the Schmitt trigger 70, such that its output is an amplified positive pulse which is impressed on the base 82b of the NPN transistor 82 and turns it ON. This places the collector 82c at substantially ground potential, thereby causing the pulse amplifier output terminal 83 to fall from its Zener diode biased voltage of +6 volts to substantially ground potential. This provides a negative pulse output on the output terminal 83 very materially amplified over the initial read head pulse of several millivolts. This amplified negative pulse forms the third input 83′ to the respectively connected channel AND gate diode, FIGS. 1 and 12. In this manner, when a data signal is read in any of the channels, the respectively connected AND gate is opened and passes a low value potential to the base of its respectively connected NPN inverter 61. The inverter which is thus turned OFF emits a positive pulse which is adapted to be transmitted to a computer N register.

Since this interpreter is adapted to read a modified binary code, at times data signals may appear in more than one channel substantially simultaneously. When this occurs, it is desirable to have the input to the computer include signals in all of the channels comprising a given coded data character. This could be readily accomplished if the recording on the magnetic tape were perfectly aligned and if the read head coils 67 and the tape also were in perfect transverse alignment. Such perfect alignment would assure that all data signals indicative of a single character would start simultaneously and would end simultaneously. This, however, may not always be the case.

The present interpreter is provided with an arrangement which will compensate for skew errors in both recording and reading, so that the computer will receive the correct information. The interpreter also is provided with an arrangement which further assures against the transmission of spurious signals to the computer. In addition, the interpreter is provided with an arrangement to assure against the transmission of any information to the computer receiving register; i.e. the N register, during the time that the computer is shifting data from its N register to its A register. All of these refinement control features are incorporated in the interpreter in order to assure the accuracy of the data supplied to the computer and to assure that it is transmitted only at such times as the computer is in condition for receiving and processing of the information supplied to it.

In connection with the latter aspect of supplying information to the computer only when the computer can utilize such information, the interpreter is constructed and arranged to supply to the computer an instruction which informs the computer when its N register has received a complete set of signals representative of a complete character, at which time the N register is in condition to shift this word to the computer A register. All of these functions of the interpreter are provided by a system of delays and controls which inhibit the generation of signals in some circuits at predetermined periods and which produce the desired output signals in certain circuits at predetermined times.

As data is read and pulses are amplified by the pulse amplifier in each channel, these amplified pulses pass to the control and instruction generating parts of the system, as well as directly to the channel AND gates. In passing to these other parts of the system, the pulses pass from the pulse amplifier output terminal 83 and are transmitted as inputs to an OR gate 84. Each of the channels is connected to provide one input to the OR gate 84, such that in a four-channel interpreter as shown in FIG. 1, the OR gate 84 is a four-input gate. This gate may be of any suitable type, such as that illustrated in FIGS. 14 and 15. In these two figures, the gate is shown as including a pair of inverters on the output side thereof. These inverters do not specifically serve any logic function in the system but are utilized simply as further amplifiers to assure a sufficiently strong signal for the proper operation of the control and instruction generating parts of the system and to provide an output pulse of the same sense as that from the gate itself.

As shown in detail in FIG. 14, the output terminal 83 of each channel pulse amplifier is respectively connected to a separate gate diode 85. The cathodes of the diodes 85 form the inputs to the gate, and all of the anodes of these diodes are connected in parallel to a common output terminal 86 and to resistor 87, the other terminal of which is connected to any suitable gate load voltage, such as a +12-volt D.C. source. If no signal is being read by the read head in any of the channels, the voltage on all of the channel pulse amplifier output terminals 83 is substantially +6 volts D.C. set by two series-connected Zener diodes 83′, connected between ground and load resistors to a suitable voltage, such as a +15-volt D.C. source. This is the voltage which is impressed on all of the cathodes of the diodes 85, and, since substantially the +12-volt D.C. gate load, voltage is impressed on the anodes of these gate diodes, no current will flow through any of the gate diodes, so that the gate output terminal 86 will be at substantially the +12-volt D.C. gate load voltage. When data is read in any of the channels, the voltage on the respective channel amplifier output terminal 83 is reduced to substantially ground potential, so that current will flow through the respectively connected diode 85 of the gate 84. This current flow will pass through the gate load resistance 87, causing a drop in voltage thereacross which results in a corresponding drop in voltage at the gate output terminal 86, such that this latter voltage is reduced substantially to ground potential. This produces a negative pulse, which is impressed on the base 88b of an NPN transistor 88, the emitter 88e of which is grounded, and the collector 88c of which is connected to a suitable positive voltage, such as a +12-volt D.C. source, through a resistor 89. The collector 88c is clamped by a suitable voltage, such as a +6-volt D.C. potential to which it is connected through a diode 89', which serves to maintain the collector 88c at substantially +6 volts as long as the transistor 88 is turned OFF.

When the negative pulse from the OR gate 84 is impressed on the inverter base 88b it substantially cuts off this inverter, so that the current flow through the resistor 89 is very substantially reduced, being limited to that which flows through the diode 89' to the +6-volt clamping voltage. When this occurs, the voltage on the output terminal 90 between the resistor 89 and the inverter collector 88c rises materially to substantially the clamping voltage, such that a positive pulse is generated and is transmitted to the inverter base 91b of an NPN inverter 91. The emitter 91e of the inverter 91 is connected to ground and the collector 91c thereof is connected to a suitable supply voltage, such as a +12-volt D.C. source, through a suitable load resistor 92. It also is connected to a suitable clamping voltage, such as a +6-volt D.C. voltage, through a diode 92'. As a result, when a positive pulse is impressed on the inverter base 91b, the inverter 91 is turned ON, and current will flow from the supply voltage through resistor 92 and the transistor 91 to ground. This will result in a drop in voltage across the resistor 92, such that the output terminal 93 between the resistor 92 and the transistor collector 91c will be reduced substantially to ground potential, thereby producing an amplified negative pulse output on the output terminal 93 in response to the reading of data by the read head in any of the channels. This is the output of the OR gate 84, and it is adapted to be impressed upon a two-input AND gate 94 as one of the inputs thereto.

Any suitable two-input AND gate can be used for controlling this part of the circuit, and FIG. 16 shows details of such a suitable gate. FIG. 17 illustrates a simplified symbolic representation of this gate, wherein dotted rectangles corespond to similarly dotted rectangles of FIG. 16. As shown in both of these figures, the output of the gate proper passes through two inverters which actually constitute part of the gate 94. These two inverters perform no logic function in the system and are added in order to assure sufficiently strong output signals from the gate and to restore the sense of the output pulse to that of the gate proper. These inverters function as amplifiers of the actual gated signal and are not shown on the logic diagram of FIG. 1.

As shown in FIG. 16, the AND gate 94 comprises a pair of diodes 95 and 96, with the anodes thereof forming the inputs to the gate. The cathodes of the diodes 95 and 96 are connected in parallel to a common output junction 97 and are connected to a suitable negative potential, such as a −6-volt D.C. source, through a load resistor 98. The anode of the diode 95 of the AND gate 94 is connected to the output terminal 93 of the OR gate 84 so as to receive the signal from this gate. The anode of the diode 96 of gate 94 is connected to an inverter 99 which normally is at a low level potential.

Referring to FIG. 16, if the anode of diode 96 is at its low level potential and data is read by the read head in any of the interpreter channels, a negative pulse will be impressed upon at least one of the inputs of the OR gate 84, resulting in a negative pulse output which will be impressed upon the anode of gate 94 diode 95, this negative pulse will result in a drop in voltage on the diode 95 from +6 volts to ground. Under these conditions both diode 95 and 96 will be at ground potential so that the output junction 97 will be brought to ground potential. This will produce a low level pulse which will be impressed upon the transistor base 100b of an NPN transistor 100 and thereby turn OFF this transistor.

The collector 100c of the transistor 100 is clamped by a suitable positive voltage, such as a +6-volt D.C. source, and, when the transistor 100 is turned OFF, its output terminal 101 is raised from ground potential to substantially +6 volts. The output terminal 101 is connected to the base 102b of an NPN transistor 102, and, when the potential of the output terminal 101 is raised to +6 volts, this positive potential is impressed on the transistor base 102b and turns ON this transistor. The collector 102c of inverter 102 is connected to a positive clamping voltage through a suitable diode 103', and its connection thereto forms the output terminal 104 of the gate 94. The collector 102c also is connected to a suitable load voltage, such as a +12-volt D.C. source, through a resistor 103. When the transistor 102 is turned ON, current flows through the resistor 103 and the output terminal 104 drops to substantially ground potential. This causes a negative pulse to be emitted from the gate 94, and this negative pulse is adapted to be impressed on the input of a delay circuit 105.

This delay circuit is used to allow all data signals representing a single word or character and theoretically occurring simultaneously in all channels of the interpreter to pass to the channel AND gates, even though there may be substantial skew in the magnetic tape record or between the tape and the read head. The delay is made sufficiently long so that all data signals which should appear simultaneously will pass through the channel AND gates and the respectively connected inverters to the computer N register before the delay circuit 105 emits its output signal. This delay has a relatively short time duration of about 150 microseconds which has been found to be sufficient for the purposes of the circuit. FIG. 18 illustrates details of a suitable delay circuit for this part of the system and FIG. 19 shows a simplified symbolic representation of this delay circuit.

When the AND gate 94 emits a negative pulse indicative of the reading of data by the read head 10, this negative pulse is impressed on the input of the delay circuit 105 and passes to the base 106b of an NPN transistor 106 thereby turning OFF this transistor. The collector 106c of the transistor 106 is connected to a suitable positive D.C. supply voltage through a resistor 107, so that when the transistor 106 is turned OFF its output terminal 108 is raised substantially to the supply voltage. This causes a positive pulse to be emitted which is impressed upon the base 109b of an NPN transistor 109, the collector 109c of which is connected to a suitable positive D.C. supply voltage through a resistor 110. The connection of the resistor 110 to the transistor collector 109c forms the output terminal 111 of this inverter.

Prior to the time that a positive pulse is impressed on the base 109b of the NPN transistor 109, the terminal 111 is at a +12-volt potential since the transistor 109 is turned OFF and no current flows through the resistance 110. This terminal 111 is also connected to an input circuit of a monostable multivibrator. This input circuit comprises a condenser 112, one side of which is connected directly to the terminal 111 and the other side of which is connected to a divided circuit at a junction or connection point 112'. One branch of this divided circuit comprises a fixed resistance 113, connected between the junction 112' and ground, and the other branch of which is connected to the junction 112' through a diode 114. The anode of this diode 114 is connected to another divided circuit, one branch of which includes a fixed resistance 115 in series with a variable resistance 116 connected to a +12-volt D.C. source and the other branch of which is the monostable multivibrator 118. These two branches of the latter divided circuit are connected together and to the anode of the diode 114 at a junction or connection point 117, which forms the input to the monostable multivibrator. Since the resistor 113, 115, and 116 form a series circuit through the diode 114 between ground and the +12-volt D.C. source, a current will normally flow therethrough, and the connection point 112' will be at a potential slightly above ground. The resistors 116 and 115 also form part of a series circuit from the +12-volt D.C. source through the connection point 117 to the base of the left-hand transistor of the monostable multivibrator 118, and to a divided circuit in one branch of which is a condenser 119, and the other branch of which is a fixed resistor 119', which is connected to a —6-volt source. The condenser 119 also is connected to the collector of the right-hand transistor of the monostable multivibrator 118 and through a fixed resistance to a +12-volt D.C. source, so that the condenser 119 has a charge of nearly 12 volts, similar to the charge on the condenser 112 before the transistor 109 is turned ON.

When the positive pulse from the transistor terminal 108 is impressed as an input pulse on the base 109b of the transistor 109 so that this transistor is turned ON, the transistor collector 109c and the terminal 111 instantly go to ground potential and remain at this voltage for the duration of the input pulse on the transistor base 109b. When this occurs the junction point 112', connected to the other side of the condenser 112 from the terminal 111, becomes a negative 12 volts, because the condenser 112 cannot instantly discharge its 12-volt charge when the terminal 111 goes to ground potential. Point 112' reaches substantially ground potential at the end of the short duration of the input pulse on the transistor base 109b. Since the junction point 112' is connected to the connection points 117 through the diode 114, the point 117 also goes to a negative 12 volts when the terminal 111 is grounded through the transistor 109. This negative voltage on the connection point 117 is impressed on the base of the left-hand transistor of the monostable multivibrator 118, thereby turning OFF this transistor which was in the ON state.

This negative voltage also is impressed on one side of the condenser 119, the other side of which was at a positive 12 volt prior to this change in potential at the connection point 117. The switch of the left-hand transistor to its OFF condition causes the monostable multivibrator output terminal 120 to go to substantially +12 volts, and this voltage is impressed through a suitable fixed resistance on the base of the right-hand transistor of the monostable multivibrator, thereby turning this latter transistor ON. This grounds the collector of this transistor, and thereby grounds the side of the condenser 119 connected thereto. Since the condenser 119 cannot discharge its +12-volt charge instantly through the grounded right-hand transistor, the side of the condenser 119 connected to the base of the left-hand transistor, goes temporarily to substantially —12 volts. This causes the two transistors of the monostable multivibrator 18 to remain in this switched condition for the time required to discharge the condenser 119. The discharge path for this condenser is through the resistor 115 and 116, and the variable resistor 116 is set, for the purpose of this invention, so that the monostable multivibrator 118 will remain in this switched condition for approximately 200 microseconds. Thus, the values of the condenser 119 and of the variable resistance 116 determine the time delay which is obtainable by the delay circuit 105. This type of monostable multivibrator is not new, and any suitable unit may be used for the desired purposes. A unit of this type is described in the "GE Transistor Manual," 7th Ed., 1964, pp. 200-201. Such a multivibrator is very similar to a flip-flop except that one cross coupling therein permits A.C. coupling only, as a result of which the flip-flop remains in its unstable state only until the circuit reactive components discharge. The monostable multivibrator 118 is of the capacitor cross-coupled type and, for any given coupling capacitor 119, the timing can be varied by a variation in the triggering voltage input to the multivibrator. This input triggering voltage, in the present instance, is controlled by controlling the value of the variable resistance 116 as has been explained. The output voltage at terminal 120 of the monostable multivibrator will have a voltage-time characteristic of the type shown at 120'-120" and returns to ground potential when the multivibrator switches back to its stable condition after the discharge of condenser 119 and the return of point 117 to a positive potential.

This voltage output is impressed upon a resistance voltage-divider network including resistances 121 and 122 upon which it is impressed through a suitable condenser 123 at a junction point 124. Due to the capacitive coupling of the condenser 123, the voltage which appears on the junction point 124 will be in the nature of an initial positive pulse at the time of the rise in voltage from the monostable multivibrator output, as indicated in the curve in FIG. 20 at 124', after which the voltage remains at substantially zero until, at the end of the time delay pulse output from the monostable multivibrator, a negative pulse is impressed on the junction point 124 through the condenser 123, due to the fall in the voltage output of the multivibrator 118. The junction point 124 is conencted to the base 125b of an NPN transistor 125 such that this transistor 125 normally is turned ON due to the voltage on its base from the D.C. source connected to the voltage divider network. When the positive pulse 124' is impressed on the transistor base 125b from the junction point 124, it has substantially no effect on the transistor 125, since this transistor already is turned ON; however, when the negative pulse 124", FIG. 20, is impressed on the transistor base 125b, it will momentarily turn OFF the transistor 125. The transistor collector 125c is connected by a suitable positive D.C. voltage through a load resistance 126, which is connected thereto at terminal 127. When the transistor 125 is turned ON current flows through the resistance 126, and the terminal 127 goes to substantially ground potential. When a negative pulse 125" is impressed upon the transistor base 125b so that the transistor 125 is turned OFF, current substantially decreased through the resistance 126 and flows therethrough to the +6-volt clamping voltage through the diode 126', and the voltage at the terminal 127 rises substantially to the clamped value of +6 volts and remains at this value until the transistor 125 is again turned ON after the negative input pulse 124" has passed. This results in a positive pulse on terminal 127 as shown at 127', FIG. 20, which occurs at a desired time delay subsequent to the occurrence of the input pulse impressed on the input transistor base 106b of the delay circuit 105.

This positive pulse output of delay circuit 105 is adapted to be impressed as an input signal on one terminal of a binary 128, which may be of any suitable type, such as that previously described and illustrated in detail in FIG. 8. In the present instance, the permanently grounded flip-flop input transistor terminal is terminal 33 connected to flip-flop transistor 32, and the reset circuit of the system which is grounded through relay contacts 40 is connected to terminal 31 of the flip-flop input transistor 30. With this circuit arrangement the binary input from the delay circuit 105 is connected from the delay circuit terminal 127 to the binary input terminal 49, such that a positive pulse on the delay circuit terminal 127 will produce a positive or high level output on terminal 45 of binary 128. This high level output from binary 128 may be called the "N-Ready" signal and occurs at the end of the predetermined time delay which is sufficient to allow for the passage of all data signals in all channels of the interpreter, allowing for a predetermined amount of nonsimultaneous occurrence of data signals in different channels due to skew in the recording in the tape, as well as for a predetermined amount of skew between the tape and the read head. The N-Ready signal is adapted to be impressed upon the GE–225 computer to inform it that its N register has received a complete character and is ready to shift this information to the computer A register. The GE–225 computer conventionally has a terminal adapted to receive the N-Ready signal.

When the computer receives an N-Ready signal, it shifts the information in its N register to its A register. Also upon receipt of the N-Ready signal, the computer conventionally emits a signal which, in the present instance, is adapted to be transmitted to the interpreter to inform the interpreter that the information which has been assembled in the N register is being shifted from the N register to the A register. This computer signal is called, for short, an SNA signal.

During the time that information is being shifted from the N register to the A register in the computer, it is essential that no further information should be fed to the N register, and this is inhibited by the use of the SNA signal. As shown in FIG. 1, a two-input AND gate 129 is connected in the interpreter system so as to provide control of the binary 66, which in turn controls the enable circuit 65 connected to an input of each of the interpreter channel AND gates 54, 55, 56, and 57. AND gate 129 may be of any suitable type, such as that shown in detail in FIG. 10, and is illustrated symbolically in FIG. 11. One of the diode inputs of this gate may be connected to receive the SNA signal from the computer and the other diode input of this gate may be connected to receive an output signal from the output 27 of binary 20. Since the output of binary 20 at its terminal 27 is at a high value all during the time the interpreter is turned ON and reading tape, one of the requirements for a positive pulse output on gate 129 is continuously present under these conditions. Thus, when the SNA signal, which is a positive pulse, is received on the other input of gate 129, current ceases to flow through its load resistor 25, FIG. 10, and the potential on its output terminal 26 is raised substantially to the load voltage on the resistor 25. Thus, when an SNA signal is impressed on gate 129, a positive pulse is emitted and is impressed on binary 66 at its input terminal 41, FIG. 8. This flips this binary, so that its output terminal 27 goes to a high level potential, and this is transmitted by the enable circuit 65 to each of the channel AND gate input diodes 65', thereby inhibiting the transmittal of any further signals in any of the channels. Thus, whenever an SNA signal is received by the interpreter while it is in operation, no signals are emitted and transmitted to the computer until the enable circuit 65 is restored to a low level potential condition, and consequently no information is fed to the computer during the time when data is being shifted from the N register to the A register.

When the N register of the computer has been completely emptied, the computer emits a "K=0" signal which tells the interpreter that the content of the N register is zero. This K=0 signal is impressed on the interpreter binary 128 at input 41 so as to reset this binary whereby its output terminal 45 is reduced to a low level. It will remain in this state until the next character or word has been transmitted to the computer N register, after which another N-Ready signal is generated and transmitted to the computer from binary 128, as previously explained.

After the information has been completely shifted out of the N register to the A register of the computer, the interpreter channel AND gates again must be reset to permit the transmittal of data from the read head 10 to the computer. Such transmittal was inhibited by the high level output of binary 66 on enable circuit 65 resulting from the SNA instruction signal. It, therefore, is necessary to flip binary 66, so that its output from terminal 27 thereof will return to a low level potential.

For normal magnetic tape reading speeds, the longitudinal spacing between record bits on the magnetic tape is sufficiently great so that the information can be completely shifted from the N register to the A register between legitimate data recordings on the tape. Advantage is taken of this time between readings to shift the transmitted information between the computer N and A registers, as has been explained. During this information shifting period, it is desirable to prevent the generation of any false N-Ready signal during the time that the gate 129 is closed. These additional precautions to assure the proper operation of the interpreter are provided by utilizing the output of delay 105 to provide an additional delay during which gate 94 is closed to prevent the transmission of spurious signals through this gate after the delay signal by delay circuit 105 has been initiated in response to the reception of a data signal from one of the interpreter channels. This is accomplished by impressing the output of delay circuit 105 from its terminal 127 upon another delay circuit 130. For operational reasons but having no logic purpose, the positive output pulse from delay 105 is inverted before it is impressed upon the input of delay circuit 130. This is simply because it is necessary that the input pulse to this latter delay circuit be a negative pulse in order to obtain the desired output from the specific circuit utilized, where this circuit is of the type shown in detail FIG. 21. Any other suitable similar delay circuit could be used which might or might not require the inversion of the delay 105 output signal as its input. The details of delay circuit 130, as shown in FIG. 21, are basically the same as those which have been explained with reference to delay circuit 105, shown in FIG. 18, except that the output signals are taken from different junctions in the circuit and certain electric quantities are changed in order to obtain a relatively longer time delay. In the illustrated circuit, this delay is made about 1.5 milliseconds. The inverter 131, which is provided between the delay circuit 105 output terminal 127 and the input terminal of the delay circuit 130 may be of any suitable type, such as that shown in detail in FIG. 4 and represented schematically in FIG. 5.

As shown in FIG. 4, the inverter may comprise an NPN transistor 132 having its emitter 132e permanently grounded and its collector 132c connected to a supply voltage through a suitable load resistor 133, with the connection 134 between the resistor 133 and the transistor collector 132c forming the output terminal of the inverter. In addition, the collector 132c is connected to a suitable clamping voltage, such as a +6-volt D.C. source, through a diode 133'. With such an arrangement, if a positive pulse or high level potential is impressed upon the terminal of the inverter connected to the transistor base 132b, the transistor 132 will be turned ON and current will flow from the supply voltage through the resistor 133 to ground, such that the inverter output terminal 134 will go to substantially ground potential. Reverse flows of current from the clamping voltage is prevented by the diode 133'. Thus, a negative pulse output at terminal 134 is produced. In order to assure a definite operating characteristic to such an inverter, the base 132b thereof may be permanently biased by a negative potential through a resistor 135.

Thus, when a positive pulse appears on the output terminal 127 of delay circuit 105 and is impressed upon the base of inverter 131, FIG. 1, the inverter will emit a negative pulse which will be impressed upon the input terminal 136 of delay circuit 130. This input terminal normally is at a high level potential since it is connected directly to the positive +6-volt clamping voltage on the output terminal of inverter 131. The delay circuit input terminal 136 is connected to the base 137b on an NPN transistor 137, which is provided with a collector 137c connected to a suitable positive voltage through a load resistor 138. The emitter 137e of the transistor 137 is permanently ground, with the result that as long as there is a high level potential on the inverter 131 output terminal, the transistor 137 is turned ON, and the connection terminal 139 between the transistor collector 137c and the load resistor 138 remains substantially at ground potential. When a positive pulse is impressed upon the inverter 131 by the delay circuit 105 and it emits a negative pulse which is impressed upon the transistor base 137b, the transistor 137 is turned OFF. When this occurs, the voltage on the output terminal 139 of the transistor 137 rises to substantially the supply voltage, and a positive pulse is emitted which is impressed upon the base 140b of an NPN transistor 140 having an emitter 140e which is permanently grounded. The transistor 140 also is connected to a suitable positive voltage through a load resistor 141 which is connected to the transistor collector 140c. This connection point of the collector to the resistor 141 forms the output terminal 141' of this transistor. The base 140b is biased by a suitable negative potential through a biasing resistor 140' so that the transistor 140 normally is turned OFF.

The occurrence of a positive pulse on the output terminal 139 of the transistor 137, which is impressed upon the transistor base 140b, overcomes the negative biasing voltage and turns ON the transistor 140, such that its output terminal 141' goes to substantially ground potential and thus emits a negative pulse. This negative pulse forms the input to a monostable multivibrator 142, which may be of any suitable type similar to that described in the "GE Transistor Manual," supra. The input circuitry and time duration of this monostable multivibrator is very similar to that of delay 105 and is connected to terminal 141' through a condenser 143 and a diode 143' having a terminal 144. In this instance, the delay circuit provides two different distinct output signals from two different output terminals. One of these terminals 145 is immediately connected to the monostable multivibrator on the cross connection of the flip-flop which includes only a condenser and, therefore, permits only alternating current coupling. This is the opposite terminal to that which is used as the output terminal of monostable multivibrator 118, FIG. 18, and is a negative pulse having a time duration which is determined by the electrical constants of the monostable multivibrator 142 and the input or triggering voltage to which it is subjected. This negative pulse is represented in FIG. 23 as the pulse 145'–145" and can be varied in its time duration by variation of the resistance in a variable resistor 146 in the same manner as has been explained with reference to delay circuit 105, FIG. 18. This time control includes the variable resistor 146 and a fixed resistor 146' connected to the diode terminal 144 and through the diode to the input condenser 143 and to a grounded fixed resistor 146". The input pulse on terminal 144 is indicated at 144' in FIG. 23. The output from the monostable multivibrator at its terminal 145 also is connected to a voltage divider circuit, including resistance 147 and 148, to which it is coupled through a condenser 149 connected to the voltage divider network at 150 between the two resistances 147 and 148. When the negative pulse 145'–145" passes through the condenser 149 the drop in voltage at the leading edge of the pulse causes a negative pulse to pass through the condenser 149 and to be impressed upon the voltage divider network at 150, after which the potential on point 150 returns to its substantially former value for the duration of the negative pulse 145'–145", after which a positive pulse is transmitted by the condenser 149 to the voltage divider connection point 150 on the occurrence of the delay trailing edge 145" rise in voltage. These two pulses are indicated as a negative pulse 150' and a positive pulse 150" in FIG. 23. The connection point 150 in the voltage divider network is connected to the base 151b of an NPN transistor 151, the emitter 151e of which is permanently grounded. The collector 151c of this transistor is connected to a suitable load voltage, such as a +12-volt source, through a load resistance 152. It is clamped by having the collector connection point 153 connected to a suitable source of positive voltage through a diode 152'.

The voltage divider network is connected between ground potential on one side of resistor 147 and a negative potential on the opposite side of resistor 148, such that the connection point 150 normally is at a negative potential somewhere between ground and the negative voltage connected to the other terminal of the resistor 148. Thus, the base 151b of the NPN transistor 151 normally is at a negative potential so that this transistor is normally turned OFF. As a result, when negative pulse 150' from the voltage divider network connection 150 is impressed on the transistor base 151b, the transistor 151 remains turned OFF until the positive pulse 150" is impressed on the base 151b. When this occurs, the transistor 151 is turned ON, and its terminal 153 goes to substantially ground potential, with the result that a negative pulse is emitted from this terminal of delay circuit 130. This negative pulse is indicated in FIG. 23 at 153'.

The function of closing gate 94 after a predetermined delay additional to the delay determined by delay circuit 105 is obtained by connecting the output terminal 145 of the monostable multivibrator 142 in delay circuit 130 to the base of clamped inverter 99. This inverter is of the NPN type, such as that shown in detail in FIG. 4, in which the inverter emitter is permanently grounded and its collector is connected to a suitable positive supply voltage through a resistor and to a clamping voltage through a diode, and, as previously explained, the collector of the inverter 99 is also connected to the input diode 96 of gate 94. With this arrangement, the emission of negative pulse 145'–145" by the monostable multivibrator 142 shuts OFF the inverter 99, with the result that its collector goes to substantially the positive clamping voltage, and this voltage is impressed on diode 96 of gate 94, thereby effectively closing this gate until the inverter 99 again is turned ON. At the end of the time delay as determined by the duration of negative pulse 145'–145", the potential on the base of inverter 99 will be returned substantially to the positive biasing voltage connected to terminal 145, so that the inverter 99 again will be turned ON and its collector will be returned to substantially ground potential. This will produce a low level voltage on input diode 96 of gate 94 and thereby again predispose this gate to permit the passage of any negative pulse signal received by it on its other diode 95 from OR gate 84. In this manner, the emission of any spurious or false N-Ready signals are prevented for the period as determined by delay circuit 130, and, since the computer is capable of emptying its N register in much less time than the delay time of delay circuit 130, no false N-Ready signals will be transmitted to the computer while the N register is being emptied.

After the information has been completely shifted out of the N register to the A register of the computer, the channel AND gates again must be reset to permit a transmittal of data from the read head to the computer. Such transmittal was inhibited by the high level output from binary 66 which resulted from the SNA instruction signal. It is, therefore, necessary to flip binary 66 so that its output terminal 27 will return to a low level. This is accomplished by utilizing a second output from delay circuit 130 which appears on terminal 153 as negative pulse 153'. Delay circuit terminal 153 is connected to the base of a suitable NPN inverter 154, which is of the same type as that illustrated in detail in FIG. 4. The collector of inverter 154 is biased by any suitable positive voltage through resistor 155 such that it is turned OFF when negative pulse 153' is emitted from delay circuit 130 terminal 153 and is impressed on the inverter base. This stops the flow of current through the inverter 154, such that its collector is raised substantially to the positive voltage to which it is clamped. The collector of inverter 154 also is connected to input terminal 49 of binary 66, so that when the collector goes to a high level potential when the inverter is shut OFF, the positive pulse emitted thereby is impressed on binary 66 terminal 49. This flips this binary, so that its output terminal 27 is placed at a low level potential which is impressed, as previously described, on enable circuit 65, and, through this circuit, on each of the input diodes 65' of each channel AND gate. Since the enable circuit 53 has remained at a low level potential, thus keeping the channel gate input diodes 53' at a low level, all of the channel gates now are ready to transmit data signals which may be received from any of the read head coils 67. As previously explained, the delay of delay circuit 130 is of such duration that for normal reading speeds of about 30 inches per second, the channel AND gates will be inhibited from transmitting data only for a time less than the longitudinal spacing between record bits in the magnetic tape, so that any legitimate record will be transmitted by the interpreter to the computer.

The foregoing procedure for reading magnetic tape and intermittently transmitting the information thus read to a computer, while inhibiting the transmittal of possible undesirable recordings or other spurious pulses, and generating desired instructions which are transmitted to the computer to govern its operation, is repeated automatically by the interpreter as has been explained. All of this is done without the necessity of stopping the movement of the magnetic tape over the read head.

For any particular type of record, the programmer will know the type of signal which will indicate the end-of-record, so that in making up the program for the computer, this end-of-record signal can be recognized by the computer, and it will then emit an HPT signal, which, as has been previously explained, will act on gate 22 so as to cause the application of the electromagnetic brake 18 to stop the take-up reel 15 and concurrently raise the pressure roller 17 away from the driving capstan 14 so as to remove driving pressure from the magnetic tape. This will stop the magnetic tape after which the driving motor 11 can be stopped manually by opening the switch 12, or the interpreter can again be placed into operation by the computer by the emission of an RPT request signal. In the latter case, the interpreter again will function in the same manner as has been previously explained.

A modification of the interpreter system disclosed in FIG. 1 is illustrated in FIG. 1a. In this arrangement, the tape transport, including the capstan drive motor 11, with its manually operable switch 12 for connecting and disconnecting it to suitable source of power 13, together with the tape driving capstan 14, the tape take-up reel 15, and its clutch 16, is the same and performs the same function as in FIG. 1. The control of the tape drive by a pressure roller 17 and a take-up reel electromagnetic brake 18, energized through a relay 19 having contacts 46 for connecting and disconnecting the brake coil 47 to a suitable source of direct current, also is the same as in FIG. 1. Basically the operation of this interpreter is the same as that of FIG. 1 in that it is responsive in the same general manner to request or information signals RPT, I/O-N, HPT, SNA, and $K=0$ from the computer component to which it is adapted to supply data and control signals.

The primary difference between the circuitry of FIG. 1 and FIG. 1a is in the use of inverters between the outputs of the binaries 20, 66, and 128, and the terminals to which these outputs are connected. The use of these inverters results in slightly different connections of the binary outputs where the inverters are used, for the reason that the outputs of the inverters must be in the same sense as in the circuits to which the FIG. 1 outputs are connected without inverters in order to obtain the same type of operation.

Thus, in the control of the relay 19, its energization is controlled by the binary 20 through an unclamped inverter 156. This inverter may be of the type shown in detail in FIG. 6 and include an NPN transistor 157 having a base 157b connected to the output terminal 45 of binary 20. The transistor emitter 157e is permanently grounded and its collector 157c is connected to one terminal of the relay coil 19, the other terminal of which is connected to a +12-volt source of direct current. This latter source of direct current, in effect, is the supply potential to the transistor collector 157c, so that when an RPT signal is received on gate 21 from the computer, such that a positive pulse is impressed on the binary 20 input terminal 41, a low level voltage will appear on its terminal 45. This low level voltage will be impressed on inverter base 157b, FIG. 6, thereby turning OFF this inverter and opening the circuit of the relay 19. When this occurs, the relay contacts 46 are opened so that the brake coil 47 is deenergized, thereby releasing the take-up reel 15 permitting it to exert a take-up force on the tape, and concurrently the pressure roller 17 is biased into pressure engaging position with the magnetic tape pressing it into driving engagement with the capstan 14. Thus, when the computer emits an RPT command the net effect upon the tape drive in FIG. 1a is the same as that in FIG. 1.

Similarly, when the computer emits an HPT signal which is impressed on gate 22, such that a positive pulse is emitted from this gate and impressed on binary 20 input terminal 49, the binary output 45 is raised to a high level voltage which is impressed upon the transistor base 157b, FIG. 6, with the result that transistor 157 is turned ON, since its collector 157c is connected to the coil of the relay 19. This results in the energization of the relay 19, so that its contacts 46 are closed. As a result, the brake coil 47 is energized. This concurrently applies to the brake 18 so as to stop the take-up reel 15 and moves pressure roll 17 away from the capstan 14, thus stopping the drive of the magnetic tape. This operation is identical with the operation of the interpreter of FIG. 1 in response to an HPT command signal from the computer.

The effects of the RPT and HPT commands from the computer on the remainder of the interpreter system also are the same as in the system of FIG. 1, although slightly different connections are required in some respects. The safety gate 129 which inhibits the transmittal of data to the computer during the time that the computer is shifting information from its N to its A register is connected exactly the same as in FIG. 1, and it operates in exactly the same manner. It should be noted, however, that enable circuit 53 is connected to binary 20 output terminal 27 through inverter 158, instead of being connected to binary 20 output terminal 45. The inverter 158 may be of any suitable type, such as that illustrated in detail in FIG. 4. Since the potentials on binary 20 output terminals 27 and 45 are always opposite and since the inverter 158 reverses its input signal and emits an amplified output signal, the potentials impressed on the enable circuit 53 will at all times have the same relationship to those of this circuit as those in the interpreter of FIG. 1 as a result of any given commands from the computer. The advantage of the use of the inverter 158 in this part of the system is that it provides a definite amplification of the output of binary 20 in controlling the interpreter channel gates 54, 55, 56, and 57.

The inputs to binary 66 are exactly the same as those of this binary in the interpreter of FIG. 1, and, since the only output of this binary is the energization of the enable circuit 65, which in the present instance is through an inverter 159, this inverter is controlled from binary 66 output 45 instead of by its output 27, since these two binary outputs are always in exactly the opposite sense. The inverter 159 may be of any suitable type, such as that shown in FIG. 4, and its major advantage in this interpreter is that it provides an amplified signal to the enable circuit 65 over the signal which is impressed on this circuit by the binary 66 in the FIG. 1 system.

The remainder of the system in FIG. 1a which reads, controls, and generates data signals for the computer N register is the same as the interpreter system in FIG. 1. The generation of the N-Ready signal by the binary 128 in the present interpreter is responsive to the same inputs as in the FIG. 1 interpreter, but the output of the binary 128 is supplied through an inverter 160 and is, therefore, connected to binary 128 output terminal 27 instead of to the binary output 45. The reasons for this reversal of the binary output terminal which is utilized again is because the output signal is reversed by the inverter 160. Again the primary reason for the use of this inverter is that it provides an amplification of the output of the binary 128. This inverter 160 also may be of any suitable type, such as that shown in detail in FIG. 4. Thus, it is seen that the inverter modified systems of FIG. 1a produces the same output in response to the same input as the interpreter system shown in FIG. 1 and utilizes all of the same precautionary circuits for inhibiting undesirable signals when such signals should not be present and for generating the desired control and data signals in accordance with the requirements of the computer, as the FIG. 1 system interpreter.

A third embodiment of the present invention is illustrated in FIG. 24 in the form of a logic diagram. Specific circuitry for the various logical components schematically illustrated in this figure are not illustrated apart from those already described in that substantially the same circuitry can be used to provide the desired results. Similar logical parts will be given the same reference numerals as corresponding parts and circuits which already have been described and illustrated.

The present interpreter embodiment is illustrated as being provided with seven read-head coils 67 in the read head 10. This interpreter is adapted to read alphanumeric coded data in which four channels comprise the numeric code, which may conveniently be a 1, 2, 4, 8 or a 1, 2, 3, 6 modified binary coded decimal system. Two of the other channels may provide the additional channels required for complete alphabetic coding, and the seventh channel can be used for parity checking, which is often utilized with alphanumeric codes. The GE–225 computer is not provided with a parity check system and, therefore, the seventh channel in FIG. 24 is not illustrated as completed, since the interpreter disclosed is particularly adapted for use with the GE–225 computer. It can, of course, be utilized with computers having a parity check circuit, if these computers are adapted to emit the same request or command signals as the GE–225 computer for starting and stopping the operation of peripheral apparatus and for starting and stopping the reading of data. These command signals already have been explained with reference to other embodiments, and, in this figure, are marked as the ON and OFF signals for starting and stopping the operation of the interpreter and the STOP and READ signals, which correspond to the HPT and RPT signals previously described, for stopping and starting the reading of tape.

In contrast to the previous embodiments where the tape drive motor and the complete interpreter system was turned ON and OFF manually, the present interpreter is adapted to be controlled automatically by signals emitted by the computer component with which it is utilized. This is obtained by a control part of the system wherein ON and OFF signals from the computer are adapted to be received respectively by differentiator units 161 and 162, respectively, by connecting the inputs of these differentiators to the terminals of the computer which emits these respective signals. These differentiator units are required because all of the command signals emitted by the GE–225 computer are in the nature of positive pulses and the remainder of this control circuit is designed to be responsive to negative pulse input command signals. It is necessary, therefore, that the incoming control signals should be negative pulses and these differentiators provide triggering pulses of short duration.

The differentiator units 161 and 162 may be of any suitable type, such as those described in "Pulse and Digital Circuits," Millman and Taub, McGraw-Hill (1956), pp. 36–37, and are adapted to receive the command signals ON and OFF respectively and to produce a negative output pulse as indicated in the diagram. The output of differentiator 161 is connected to one of the inputs 163 of a binary 164, such that the negative output pulse from the differentiator 161 produces a negative or ground output pulse of low level voltage on the output 165 of the binary 164. The binary 164 may be of any suitable type, such as that of FIG. 8 or that described in "Pulse and Digitial Circuits" supra, pp. 140–143, or p. 595. The binary output 165 is connected to a terminal of relay coil 166, the other terminal of which is connected to a suitable positive D.C. voltage so that when a low level potential appears on the binary output terminal 165, the relay coil 166 is energized so as to operate the relay and close its contacts 167. These relay contacts 167 are adapted to be connected in the circuit of a transport drive motor 11, such as that shown in FIGS. 1 and 1a for driving a tape transport mechanism. Thus, when the computer emits an ON signal, the differentiator 161 impresses a negative pulse on the binary input 163 so that the relay contacts 167 will be closed and the circuit of the transport motor 11 will be energized. This will start the operation of the tape driving capstan 14.

When it is desired to stop the operation of the interpreter, the computer emits an OFF signal which is impressed upon the input to differentiator 162. This differentiator, like differentiator 161, is adapted to emit a negative pulse when it receives a positive input pulse, and the output of the differentiator is connected to one of the inputs of a 2-input OR gate 168. This OR gate may be of any suitable type and may comprise circuitry such as that shown in FIG. 14 except that two diodes 85 would, of course, be utilized instead of four diodes 85 provided in this 4-input OR gate. The output of gate 168 is connected to another input 169 of the binary 164, such that a negative pulse emitted from the OR gate 168 and impressed on the binary input 169 produces a positive pulse or high potential on the binary output 165. This output from the binary 164 is impressed on the relay coil 166 and results in a deenergization of the relay, so that its contacts 164 are opened and the tape transport drive motor 11 is thereby deenergized. In this manner, an OFF command from the computer will turn OFF the interpreter and thereby shut down the operation of the interpreter tape drive mechanism.

In some instances it may be desirable to turn OFF the interpreter and to reset the binary 164 by a manual control. This can readily be done by the provision of a manual reset switch 170 which is adapted to be supplied by a negative or low level potential which may be impressed as an input on the OR gate 168 by having one of the terminals of the switch 170 connected to an input of this OR gate. Thus, by closing the manual reset switch 170, the entire shutting down operation as explained with reference to an OFF command from the computer is put into operation and the interpreter is effectively shut down.

After the computer has issued an ON command and this signal has turned ON the interpreter, it is in condition to start reading tape whenever the computer requests it to do so. The interpreter is provided with two additional differentiator units 171 and 172 and these are connected respectively to the computer terminals from which the READ (RPT) and STOP (HPT) signals are emitted. Both of these differentiators are of the same type as differentiators 161 and 162, such that a positive input command pulse from the computer on the input of these differentiators will produce a negative output pulse on the respective differentiator output. The output of differentiator 171 is connected to one of the inputs 173 of a binary 174, which may be of the same type as binary 164, such that a negative input pulse on the binary input 173 produces a positive pulse or high level potential on binary output 175. This binary output 175 is connected to a terminal of a relay coil 176, the other terminal of which is connected to a suitable positive voltage, so that the occurrence of a high potential on the binary output 175 results in the deenergization of relay coil 176. This opens the contacts 177 of the relay, and these contacts are connected in the energizing circuit of a suitable electromagnetic brake coil 47 of a brake mechanism similar to that shown in FIGS. 1 and 1a. The remainder of the tape transport mechanism in the present interpreter may be of the same type as that shown in the previous embodiments, such that the opening of relay contacts 177 deenergizes the brake coil 47 and the brake 18 is released, with the concurrent movement of the pressure roller 17 into driving engagement with the tape so as to bias this tape into driving contact with the rotating capstan 14. In this manner, the capstan 14 advances the tape, and the slip clutch 16 drives the take-up reel 15, so as to take up the tape as it is passed in reading relation over the read head 10 of the interpreter. Thus, whenever the computer requests a reading of the tape by emitting a positive READ signal which is impressed on the input of the differentiator 171, the relay contacts 177 are opened and the magnetic tape is advanced in reading relation over the interpreter read head 10.

Under normal circumstances the tape is advanced continuously over the read head 10, as in the previously described embodiments of this invention, and it is stopped only when a complete record has been entered into the computer or a complete computation has been made, so that the computer issues a STOP command. Such a STOP command is a positive pulse, and differentiator 172 has its input connected to the computer terminal on which such a STOP command appears. This differentiator will emit a positive and a negative pulse from its output when it receives a positive STOP pulse from the computer.

The output of differentiator 172 is connected to one of the inputs of an OR gate 178, which may be any suitable type similar to OR gate 168. When a negative input pulse is emitted from differentiator 172 and is received as an input of OR gate 178, this OR gate emits a corresponding negative pulse, and the output of this OR gate is connected to an input 179 of binary 174, such that a negative pulse on binary input 179 produces a negative pulse or ground level potential on the binary output 175. When this occurs, the relay coil 176 is energized. This results in the closure of relay contacts 177, which thereby energize the electromagnetic brake coil 47. This applies brake 18 so as to stop the tape take up reel 15 and concurrently moves the pressure roller 17 away from the capstan 14, thus releasing the tape from driving engagement with the capstan. Thus, a STOP command from the computer impressed on the differentiator 172 stops the advance of the tape over the read head 10 and effectively stops a reading of the tape by the interpreter.

The reading of data in the magnetic tape, its amplification, decoding, and transmission to the input register of the computer, together with the generation of desired instructions to the computer, are basically performed in the same manner as in the embodiments illustrated in FIGS. 1 and 1a. Thus, when the interpreter has been turned ON by an ON command from the computer impressed on differentiator 161 and a request has been received by the interpreter from the computer to READ, the magnetic tape is transported in reading relation past the coils of the read head 10. Signals induced in one or more of the read-head coils 67 are transmitted from these coils to pre-amplifiers 68, which emit amplified signals from output terminals 75. These amplified signals are transmitted to pulse amplifiers 69 which further amplify these signals and emit corresponding negative pulses from the amplifier output terminals 83. The circuits of the read head, pre-amplifiers, and pulse amplifiers, can be of any suitable type such as those explained in detail with reference to FIG. 1. In the case of the parity channel the amplified pulse may then be passed directly to the parity circuit or circuits of the computer, or, in the case of a computer such as the GE–225 computer which does not have a parity circuit, this channel is simply disregarded and not connected to any exterior circuit. Where the interpreter is provided with either 4 or 6 data channels, the output terminal 83 of each pulse amplifier is connected directly to an output terminal 83' of one of the channel AND gates 54, 55, 56, 57, 180, or 181 in the same manner as in the systems of FIGS. 1 and 1a. The channel AND gates in the present embodiment are 3-input gates which may be of any suitable type, similar to those explained in detail in connection with the two previously explained embodiments. In order for the channel AND gates to transmit data signals received from the respectively connected pulse amplifiers 69 it is necessary that the other two inputs 53' and 65' be at a low level potential.

The inputs 53' of these gates are all connected to an enable circuit 53 which is energized by the output of a 2-input AND gate 182. One of the inputs 183 to the AND gates 182 is connected to the output 165 of binary 164 and the other input 184 of the AND gate 182 is connected to the output 175' of the binary 174. Thus, when the computer emits an ON command signal, the binary 164 responds with a low level potential or negative pulse on its output 165 which is impressed on input 183 of AND gate 182. Similarly, when the computer emits a READ request signal, the binary 174 responds by emitting a negative pulse or low level potential from its output 175' which is impressed upon input 184 of AND gate 182. As a result when the interpreter is turned ON and has received a READ request, both inputs to AND gate 182 are satisfied and this gate emits a negative pulse or a low level potential from its output which is impressed on the enable circuit 53 and transmitted by it to all of the inputs 53' of the channel AND gates.

As in the two previously described embodiments of this invention, no information should be transmitted from the interpreter to the input of N register of the computer during the time that the N register is shifting its contents to the computer A register. In order to inhibit the transmission of data during this period, the computer emits a positive pulse or high level potential which may be impressed upon a suitable circuit of the interpreter to prevent the transmission of signals from the interpreter to the N register. During this shifting operation, this signal from the computer, like all other signals emitted by the computer, is in the nature of a positive pulse or high level potential, and, since it occurs during the time that information is being shifted from the N to the A register, it may be termed an SNA signal. This signal is adapted to be impressed upon an inhibiting circuit 65 of the interpreter which is connected to each of the inputs 65' of the channel AND gates. In this manner, whenever no signal should be transmitted from the interpreter to the N register, the SNA high level potential signal is impressed on the channel AND gate inputs 65' and close these gates, thereby preventing the passage of any signals therethrough. After the computer N register has been completely emptied, the potential on the computer output from which the SNA signal was emitted, is returned to a low level and again prepares all channel AND gates for the transmission of data signals by impressing a low level potential on circuit 65.

As explained with reference to the other embodiments of this invention, a good normal rate of speed for the reading of the magnetic tape has been found to be about 30 inches per second. The longitudinal spacing between data bits on the tape is such that, at this speed, the channel AND gates are inhibited from transmitting data by the SNA signal only for a time less than the time lapse between the reading of successive data bits. This is made possible because the time required for the electronic shifting of data between the N and A registers is much less than the time required for reading successive data bits from the magnetic tape at this operating speed.

The output data signals of the illustrated interpreter will all be in the nature of negative pulse. If the computer to which these data signals are to be transmitted requires its inputs to be positive pulses, such as the GE–225 computer, the negative pulses from channel AND gates may simply be impressed as the inputs to suitable inverters, such as those described with reference to FIGS. 1 and 1a, so that the negative channel gate outputs will be inverted and transmitted to the computer as corresponding positive pulses.

After a complete data character has been transmitted from the interpreter to the computer N register, an instruction must be given to the computer to inform it that the N register is ready to shift the information therein to the computer A register. In order to provide this instruction to the computer, the interpreter generates a signal which may be identified as an N-Ready signal. In this embodiment of the interpreter, this N-Ready signal is adapted to be emitted from an AND gate 185. This AND gate is a three input AND gate similar to the channel AND gates, and two of its inputs 65' and 53' are respectively connected to and energized by the interpreter circuits 65 and 53. In this manner, whenever the interpreter is in operation and reading magnetic tape, the N-Ready AND gate 185 will have two of its inputs 65' and 53' at the required low level for passing signals therethrough. The third input 186 of the AND gate 185 is adapted to be energized by a negative pulse after each complete data character has been read by the read head 10 and signals representing this character have all been transmitted by the channel AND gates to the computer N register. This negative pulse is generated by a circuit which takes into account the possibility of the appearance of data pulses in a plurality of channels of the interpreter and also makes provision for assuring the complete entry of all data characters in the N register, even though there may be skew in the data recordation in the magnetic tape and skew between the alignment of the tape and the read head 10.

This is obtained by a circuit for energizing the input 186 of the N-Ready AND gate 185. This circuit includes a 6-input OR gate 187, each input of which is connected to the output 83 of a pulse amplifier 69 in a separate channel of the interpreter. Thus, whenever a data signal appears in any of the interpreter channels, it will be impressed as an input on the OR gate 187 and will cause this gate to emit an output pulse, which, in the present instance, will be a negative pulse. The output of gate 187 is connected to the base 188b of a PNP inverter 188. The emitter 188e of this inverter is grounded, and its collector 188c is connected to any suitable negative voltage through a resistor 189. With this arrangement, when a negative pulse is impressed on the inverter base 188b, the inverter is turned ON and current flows through the resistor 189, with the result that the inverter collector 188c is raised from the negative supply potential to substantially ground potential. This results in the emission of a positive pulse by the inverter from its collector 188c. The inverter collector 188c is connected to the input of a differentiator 190 which may be of any suitable type, similar to the differentiators 161, 162, 171, 172. In order to assure the entry into the computer N register of data signals in all channels comprising any single data character, it is desirable that the N-Ready signal should be delayed sufficiently to allow the passage of all such data signals from the interpreter to the N register prior to the emission of the N-Ready signal, as well as to allow for possible skew delays. This can conveniently be obtained by delaying the N-Ready signal approximately one pulse time by generating the N-Ready signal in response to the cut off time of the data pulse; that is, the trailing edge of the data pulse.

Advantage is taken of the fact that a positive pulse impressed on the input of the differentiator 190 will produce a sharp positive pulse which will appear at its output at a time corresponding to the leading edge of the positive input pulse and wil produce a sharp negative pulse which will appear at its output at a time corresponding to the trailing edge of the positive input pulse. The differentiator output is connected to the input of a pulse amplifier 191 which may be of any suitable type, such as the amplifiers 69 in each of the interpreter channels. The output of the pulse amplifier 191 will be an amplified version of the negative pulse emitted by the differentiator 190. The pulse amplifier 191 is not affected by the positive pulse emitted by the differentiator 190 at the time corresponding to the leading edge of the data pulse input and, therefore, the only pulse impressed upon the N-Ready gate 185 input 186 is the negative pulse which corresponds substantially to the trailing edge of the data pulse.

The impression of this negative pulse from the pulse amplifier 191 on the N-Ready gate input 186 results in the emission of a negative pulse from the N-Ready gate 185 which occurs approximately at the end of a data pulse transmitted from any of the channel AND gates. This provides a sufficient delay for the transmission of data pulse in all of channels comprising any one data character, thus assuring the entry of a complete data character into the computer input N register prior to the emission of an N-Ready pulse. When this latter pulse is received by the computer, it informs the computer that the N register is ready to be unloaded and that all of the information in the N register can now be shifted to the computer A register.

When the computer has thus been instructed by the interpreter, it generates and issues an SNA signal which instructs the interpreter that the information is being shifted from the N register to the A register of the computer and that no further information should be transmitted to the N register. As previously explained, this SNA pulse is a positive pulse which is impressed on circuit 65 of the interpreter and is distributed by this circuit to the input 65' of each of the channel AND gates and also to the N-Ready gate 185, thereby closing all of these gates and inhibiting the pasage of any further signals to the computer from the interpreter during the shifting operation. After the information has been completely shifted from the N register to the A register of the computer, the SNA high level potential returns to a low level potential, thus resetting all of the channel AND gates and the N-Ready gate, so that the interpreter is in condition for processing the next data character read by the read head 10 from the magnetic tape. The above procedure continues repetitively until such time as the computer instructs the interpreter to STOP reading or until it turns OFF the interpreter.

A further embodiment of the present invention is illustrated in the logic diagram of FIG. 25. Specific circuitry for the various logical components schematically illustrated in this figure are not illustrated apart from those already described because substantially the same cicuitry can be used to provide the desired results or conventional units well-known in the art will be identified by references to standard text books. Similar logical components will be given the same reference numerals as corresponding parts and circuits which already have been described and illustrated with reference to other embodiments.

The present embodiment is illustrated with seven read-head coils 67 in a read head 10 for sensing a conventional magnetic tape record. This type of read head is adapted to read alphanumeric coded data in which four channels comprise the numeric code recordings and two of the other channels provide for a complete alphabetic coding. The seventh channel can be used for parity checking and this often is utilized in connection with computers adapted to process alphanumeric codes. The present interpreter is especially designed for use with a GE–225 computer which does not utilize a parity check system and, therefore, the seventh channel in FIG. 25 is not completed. The illustrated computer also is shown as especially adapted for decoding a 1, 2, 4, 8 modified binary coded decimal system, although the same principles disclosed could be used with circuit modifications according to the present invention for a 1, 2, 3, 6 modified binary coded decimal system. Similarly, the present interpreter can be used for decoding and supplying information to computers other than the GE-225 computer, if such computers are adapted to emit the same or similar request or command signals for starting and stopping the operation of peripheral apparatus and for stating and stopping the reading of records. These command signals have already been explained with reference to other embodiments and, in this figure, are marked as the RON and OFF singals for starting and stopping the operation of the interpreter and the READ and STOP signals, which correspond to the RPT and HPT signals previously described, for starting and stopping the reading of tape.

This interpreter is somewhat more sophisticated than the previously described systems in that it performs more duties than the previously described embodiments and is more fully automatic. As in the interpreter shown in FIG. 24, the present unit is turned ON and OFF automatically in rseponse to command signals from the computer. In addition, the present interpreter performs more decoding than the other embodiments and thereby simplifies the programs which must be written by the programmer for utilizing the data transmitted to the computer by the interpreter. In the present system, the concurrent occurrence of a data signal in the channels representing the digits 2 and 8, which indicates the presence of a zero, is decoded so as to produce no output from the interpreter. When this occurs, the N input register of the computer receives zero input and recognizes this as a zero.

In the 1, 2, 4, 8 code the concurrent appearance of signals in the 4 and 8 channels indicates an end-of-word. This also is decoded by the present interpreter so that no output is emitted when an end-of-word signal appears in the record. Since this would be recognized as a zero by the computer, the programmer for the computer must provide in the program for the assembly of a fixed or predetermined count of digits per word, so that when the zero occurs after this predetermined digit count, it will be recognized and processed by the computer as indicative of the end of a complete word.

The tape transport for this embodiment may include a driving motor, capstan, tape-up reel, clutch, electromagnetic brake, and pressure roller of the type described and illustrated with reference to the other embodiments of this invention for passing tape in reading relation over the read head 10 in response to requests of the computer. The control for this tape transport is the same as that illustrated and described with reference to the computer shown in FIG. 24. In accordance with this control system, an RON request signal from the computer impressed on the differentiator 161 will turn the (reader) interpreter ON. An OFF signal from the computer impressed on the differentiator 162 will turn OFF the interpreter and completely stop its operation. A READ signal from the computer impressed on the differentiator 171 will put into operation the tape advancing mechanism of the transport as previously explained, and the encoded data in the magnetic tape will be read by the read-head coils 67. When a STOP signal is received by the interpreter differentiator 172 from the computer, the tape transport stops advancing the tape, although the tape driving motor is not shut down as has been previously explained with reference to the other embodiments of this invention. These request or command signals from the computer are processed through OR gates 168 and 178, binaries 164 and 174, and relays 166 and 176, in the same manner as in the embodiment illustrated in FIG. 24 for controlling the operation of the tape transport. As in this last previous embodiment the manual reset switch 170 may be utilized to reset the binaries 164 and 174 through the OR gates 168 and 178, respectively.

The reading of data in the magnetic tape and its amplification by the read head 10 and the pre-amplifiers 68 and pulse amplifiers 69 can be performed in the same manner and by the same units as in the other embodiments of this invention which are illustrated in detail in FIG. 2. In the present instance, the output terminals 83 of the pulse amplifiers are connected to input terminals 192 of suitable binaries 193, which may be of the same general type as binaries 164 and 174 or the binaries illustrated in detail in FIG. 8. As in those previously described binaries, if a negative signal is impressed on the input terminal 192, a corresponding negative output pulse will appear on the binary output terminal 194. Such a negative output pulse from the binary terminal 194 will be impressed as a data input on the input terminal 83' of the respective channel AND gates 54, 55', 56', 57', 180, or 181. The channel AND gates in this embodiment may be any suitable AND gates, and three of these gates 54, 180, and 181 are three input AND gates, the same as the similarly numbered and arranged AND gates of the interpreter shown in FIG. 24. The other channel AND gates also are multiple input AND gates but, in the present instance, are provided with more than three inputs. These AND gates may be of the same type as those shown in detail in FIG. 12 and provided with additional diodes corresponding to the additional inputs of the respective gates. The provision of the additional inputs to gates 55', 56', and 57' is for the purpose of decoding the zero or 10 character and also for decoding the end-of-word and end-of-tape or record characters, since these are to be suppressed without the transmission of any signal to the computer N register, as has previously been explained.

As in all of the previously explained embodiments of this invention, no information should be transmitted to the computer from the interpreter during the time that the computer N register is shifting its content to the computer A register. In order to inhibit the transmission of data during this period, the computer emits a positive pulse or high level potential which may be identified as an SNA signal and impressed upon a suitable circuit in the interpreter to prevent the transmission of signals from the interpreter to the N register for the duration of this shifting step.

During this shifting operation, this SNA signal is impressed upon an inhibiting circuit 65 of the interpreter, which is connected to the inputs 65' of each of the channel AND gates so that these gates are effectively closed, thereby preventing the passage of any signal therethrough. After the N register has been completely emptied, the potential on the computer output from which the SNA signal was emitted is returned to a low level, thereby restoring the channel AND gate inputs 65' to a low level potential and preparing this part of the gates for the transmission of data signals.

In order to assure the transmission of all signals comprising a signal character, a delay is introduced into the processing of data through the interpreter to assure that all digits comprising a single character have been transmitted by the interpreter to the computer N register prior to the time when the N register shifts its data into the computer A register. In the present embodiment, this delay is obtained by connecting all of the channel binary output terminals 194 as inputs to an OR gate 187, as in the FIG. 24 system. The output of this OR gate is connected to the input terminal 195 of a monostable multivibrator or 1-shot generator 196 which may be of any suitable type, such as that described in "Pulse and Digit Circuits," supra, pp. 174–175, and 599–600. The negative pulse output of this 1-shot generator 196, which appears on its output terminal 197, is impressed as one of the inputs to a two-input AND gate 198. This AND gate may be similar to the gate illustrated in detail in FIG. 16, and the output from the 1-shot generator 197 may be impressed as the input on a diode 95 thereof. The other input to this AND gate 198 originates as the output of another two-input AND gate 182. This AND gate 182 is in effect an enable gate, since its two inputs 183 and 184 both are adopted to be energized from the binaries 164 and 174 respectively whenever the computer has turned ON the interpreter and has called for a reading of the tape, and its output at such times is used to enable the channel AND gates to transmit data signals therethrough. Thus, whenever magnetic tape is being read, the enable AND gate 182 will have an output in the nature of the negative pulse or a low level potential which will be impressed on the second input to the AND gate 198.

The output of enable AND gate 182 is connected to input diode 96 of gate 198, with the result that whenever the interpreter is reading tape and a data signal is transmitted from the read head to any of the channel binaries 193, such that a negative pulse is impressed on the AND gate 198 input diode 95, the AND gate output will be in the nature of a negative pulse. This negative pulse will be impressed on a clocking circuit 199 and will be distributed by the clocking circuit to input 200 of each of the channel AND gates. The 1-shot generator 196 has a time delay of approximately 1.0 millisecond, such that the negative timing pulse impressed on the channel AND gate inputs 200 appears on this input approximately 1.0 millisecond after the impression of the data pulse on the channel AND gate input terminal 83' which triggered the 1-shot generator 196 through the OR gate 187. This delay provides sufficient time for the impression of all data signals comprising a single character in all of the channels upon the channel AND gates, regardless of possible skew in the recordings of the magnetic tape or possible skew between the tape and the read head.

When data pulses appear in the channels with the three-input AND gates 54, 180 and 181, these gates will pass output data pulses in the nature of negative pulses as soon as the clocking pulse is impressed on the respective input terminals 200. Gates 55', 56' and 57' are provided with additional inputs in order to decode the zero or 10 signal, the end-of-word signal and the end-of-tape or end-of-record signal as read from the magnetic tape by the read head 10 in 1, 2, 4, 8 coded recordings. The channel AND gates 54', 55', 56' and 57' in FIG. 25 respectively are in the channels through which the digits 1, 2, 4, and 8 are processed.

As previously explained, whenever the character zero or 10 is read, it is indicated in the 1, 2, 4, 8 binary coded decimal code by the digits 2 and 8. These are decoded by this interpreter so as to transmit no input to the computer N register by inhibiting the passage of any output from the interpreter on the occurrence of a character indicated by the concurrent appearance of data signals in the 2 and 8 channels of the interpreter. Under these conditions no signals are passed by the channel AND gates 55' and 57' on which the channel binaries 193 impress input signals on the respective input terminals 83'. This is brought about by an operation inhibiting circuit which includes the connection of the 2-channel binary 193 so as to inhibit an output from the 2-channel AND gate 55' at any time that an 8 digit data signal is read by the read head 10. This conveniently can be done by connecting the output terminal 201 of this latter binary to an input 202 of the 2-channel AND gate 55'. With this connection, whenever a negative signal is impressed upon the input 192 of this 8-channel binary, a positive pulse or high level potential will be impressed on the 2-channel AND gate 55' input 202 and this will prevent the transmission of any data by this gate. Thus, whenever an 8 digit is read, the transmission of a signal corresponding to the 2 digit is suppressed.

In order to assure a complete suppression of data signals in all channels when a 10 or zero is read by the read head 10 so that the computer will receive no data in any of the channels and will, therefore, recognize the data as a zero, it is necessary not only to suppress the 2 when an 8 occurs, but also to suppress the 8 whenever a 2 occurs. This can conveniently be accomplished by connections similar to those explained with reference to the suppression of the 2 digit on the occurrence of an 8 digit. In the present instance, whenever a negative signal is impressed on the channel binary input 192 of the 2-channel binary 193, a positive pulse or a high level potential appears on the binary output terminal 205. This binary terminal 205 is connected to an input 206 of the channel AND gate 57' in the 8-digit channel. As a result, whenever a signal in the 2-digit channel is impressed on the 2-channel binary input terminal 192, the 8-channel AND gate 57' input 206 is placed at a high level potential and this gate is closed. This suppresses any signal in the 8-digit channel which may occur concurrently with a signal in the 2-digit channel.

As a result of the interconnections between the 2-digit channel and the 8-digit channel, whenever a data signal appears in either of these channels, the other channel is inhibited from transmitting a data signal through its channel AND gate. Thus, a zero or 10, which in the binary coded decimal code is represented by a combination of signals in both the 2 and 8 channels, produces a total absence of data signals from all of the channel AND gates, so that the N register of the computer receives no data and, on the request for a shift of the information for the computer N register to its A register, the A register will receive no data. This is recognized as zero. Thus, the decoding of the zero or 10 digit is performed by the interpreter, and the programmer need not have the computer decode this data as coded in the magnetic tape recordings.

In the 1, 2, 4, 8 binary coded decimal code the end-of-word symbol is represented by a combination of a data signal in both the 4 and 8 channels. The GE–225 computer has no correspondingly coded symbol for the end-of-word character and, therefore, in the present interpreter the concurrent sensing of the data in the 4 and 8 signals is decoded and blocked, so that no signals will be transmitted to the computer by the interpreter on the occurrence of an end-of-word symbol in the tape record. This is accomplished in a manner similar to that for blocking the 2 and 8 when these appear concurrently.

The 4 is effectively inhibited on the occurrence of an 8 by connecting the channel binary 193 output terminal 201 in the 8-digit channel to an input of the 4-channel AND gate 56' similar to the connection of the AND gate 55' to this binary. Thus, the channel binary 193 output terminal 201 is also connected to an input 207 of the 4-channel AND gate 56'. As a result whenever an 8-digit is sensed and a negative pulse is impressed on the 8-digit channel binary 193 input 192, a positive pulse or high level potential passes from the binary output terminal 201 to the 4-channel AND gate 56' input 207, and this latter gate is effectively closed. This prevents the passage of any signals from the 4-channel AND gate 56' whenever an 8 digit is read.

It also is necessary to inhibit the passage of a data signal in the 8-channel whenever a 4-digit is concurrently read. This may conveniently be accomplished by connecting the output 208 of the 4-channel binary 193 to an input 210 of the 8-channel AND gate 57'. With this connection whenever a 4-digit is read by the read head 10 thereby producing a negative pulse on the 4-channel binary 193 input 211, a positive pulse or high level potential appears on the 4-channel binary output terminal 208 and is impressed on the 8-channel AND gate 57' input 210 and closes this gate. This effectively prevents the passage of any data signal through this gate, thereby inhibiting the transmittal of an 8-digit signal whenever it occurs concurrently with a 4-digit signal.

As a result of these connections of the AND gates 56' and 57', the concurrent reading of a 4-digit and 8-digit by the read head 10 inhibits the transmission of any signal from either of the two respective AND gates so that the computer N register receives no signal on the concurrent reading of a 4 and an 8. Since this absence of data signal in all of the channels is the same as that which occurs on the reading of a zero or 10, it is necessary for the computer to be able to distinguish between the two. Recognition of the difference is obtained by having the computer count each character shifted into the A register from the N register and after a predetermined number of characters have been received corresponding to the number of characters required for a complete word, the computer recognizes the data received as comprising a single word and processes this information as a complete word. This arrangement, therefore, requires a fixed predetermined length of word.

According to certain binary coded decimal 1, 2, 4, 8 codes, an end-of-record is coded as the decimal 14. In this code, this character is recorded on magnetic tape by concurrent bits in the 2, 4, and 8 channels. Certain computers, such as the GE–225 computer, do not recognize this decimal as an end-of-record, or end-of-tape indication, but can recognize a blank of extended duration, more than one character length, for this purpose.

In accordance with the present invention, the decimaal 14 is blocked out or suppressed by the interpreter so that the computer will receive no signal when this decimal is read. Since this will only yield the same condition as zero, it is necessary that a longer pause or blank be inserted in a tape while the recording is being made. Then the suppressed 2, 4, 8 signal will yield the desired extended blank input to the computer.

In the FIG. 25 interpreter, the reading of an 8 will suppress both the 4 and 2, as has been explained. This results from the connection of binary output terminal 201 to inputs 207 and 202 of channel AND gates 56' and 55', respectively. Similarly, the reading of a 4 or a 2 suppresses the 8. This results from the connections of binary output terminals 208 and 205 to inputs 210 and 206, respectively, of channel AND gates 57'. Thus, a reading of an end-of-tape or end-of-record 2, 4, 8 word results in a complete suppression of signals in all channels and the pause or blank inserted into the tape while recording provides the desired extended blank input to the computer.

In order to inform the computer that its N register has received a full character and is ready to transmit this data to the computer A register, a signal is developed in the interpreter which may be termed an N-Ready signal. This signal is then transmitted to the computer which conveniently has a circuit receptive to such an N-Ready signal for starting the shifting of the information from the N register to the A register.

This N-Ready signal should not be generated by the interpreter until a predetermined time delay after the reading of a data signal by the interpreter read head 10 in order to assure the transmission in all channels of all data signals which comprise a single character. This time delay may conventionally be produced by utilizing the approximate 1.0 millisecond time delay of the 1-shot generator 196 as part of the delay. In order to do this, the 1-shot generator 196 output terminal 212 is connected to the input of a differentiator 213, which may be of any suitable type similar to differentiators 161, 162, 171, and 172 previously described. With this connection a positive pulse will appear on output terminal 212 of 1-shot generator 196 when a negative pulse is impressed on its input 195 from the OR gate 187, and this positive output pulse will be impressed as the input to the differentiator 213. The output of the differentiator is connected to a second 1-shot generator 214, which may be of any suitable type, similar to the 1-shot generator 196. The output terminal 215 of the 1-shot generator 214 is the one on which a negative pulse will appear when a negative pulse is impressed on the input of the 1-shot generator 214 by the differentiator 213. This pulse also will be delayed approximately 1.0 millisecond subsequent to its input, such that this negative pulse on output terminal 215 will appear approximately 2.0 milliseconds subsequent to the negative pulse output from OR gate 187 in response to a negative data pulse on any of the inputs to this OR gate; that is, approximately 2.0 milliseconds after a data pulse has been impressed on any of the channel AND gates. As previously explained the output of the channel AND gates will be transmitted to the computer N register approximately 1.0 second after the appearance of a data pulse in any of the channels due to the 1.0 millisecond delay of the clocking pulse from gate 198 impressed on the channel AND gate inputs 200. Thus, the negative output pulse on terminal 215 of the 1-shot generator 214 is delayed approximately 1.0 millisecond after the transmission of data pulses from the interpreter to the computer N register. This negative pulse on terminal 215 is impressed on input 216 of the N-Ready gate 185.

Since another input 65' of the N-Ready gate 185 is at a low level potential during the time that information is not being shifted from the N register to the A register of the computer, two of the input requirements of this AND gate 185 are satisfied for the transmission of an N-Ready signal. The third input 217 of AND gate 185 is connected to the output of enable gate 182. The output of gate 182 is at a low level at all times when the interpreter is operating and reading tape, such that input 217 of AND gate 185 is at a low level whenever a signal is impressed on input 216 of this gate. Thus, AND gate 185 will emit a negative output pulse in response to the impression of a negative pulse on its input 216 approximately 1.0 millisecond subsequent to the transmission of data pulses from the interpreter channel AND gates to the computer N register. This negative output pulse from gate 185 is the N-Ready signal which triggers the shifting of the information from the computer N register to the computer A register.

When this shifting occurs, the computer emits a positive pulse from its SNA terminal which is impressed upon circuit 65 of the interpreter and thereby shuts OFF all of the channel AND gates, as well as the N-Ready AND gate 185. This inhibits the transmission of any further data from the interpreter to the computer N register while this latter register is shifting its content to the computer A register. It also inhibits the transmission of any spurious N-Ready signals to the computer during this period.

In this embodiment of the interpreter, each channel is provided with a separate binary through which a digital signal passes when read by the read head 10. The passage of such a digital signal through a channel binary sets the binary which will remain set until it is flipped by a reset signal. Resetting of the interpreter channel binaries preferably is done simultaneously for all binaries to assure that all channels have been reset, and therefore that all channels are in condition for transmitting any new digital signals corresponding to the reading of such digits in the respective channels of the magnetic tape record.

There are several different conditions under which it is desirable or useful to be able to reset all of the channel binaries. One of these conditions occurs after the data signals for a complete character all have been impressed upon the channel AND gates and the channel AND gates have transmitted these data signals to the computer N register. Resetting after this condition is obtained by connecting the output terminal of the differentiator 213 to an input 217 of an OR gate 218 and connecting the output terminal 219 of this OR gate to a reset circuit 220. The OR gate 218 may be of any suitable type, such as that disclosed in detail in FIG. 14, previously described, but having only three input diodes. The reset circuit 220 is connected to an input of each of the channel binaries so as to flip any of these binaries which was previously set by a data signal. In this way, all of the binaries are automatically reset after the interpreter has transmitted each reading to the computer N register, and these binaries are again in condition to transmit data signals in all of the channels as has been previously explained.

Another condition under which a reset signal can be impressed on the reset circuit 220 is after the computer N register has been completely emptied into the computer A register. When this occurs, the computer generates a "K=0" signal to indicate that the contents of the N register is zero. The computer terminal on which this signal appears can be connected to a differentiator 221 in order to obtain a negative pulse for impression as an input to the reset OR gate 219. This is obtained by impressing the positive "K=0" pulse on the input of the differentiator 221 and connecting the output of this differentiator to an input 222 of OR gate 218. Thus, whenever the computer N register has been completely emptied, the OR gate 218 will emit a negative pulse which will be impressed on the interpreter channel binary reset circuit 220. This will assure a resetting of all of the channel binaries, if for any reason such a binary was not reset by the signal impressed on the OR gate 218 by the output from the differentiator 213.

Under certain circumstances, it may be desirable to reset the channel binaries under manual control. This may be done simply by connecting the manual reset switch 170 to a third input 223 of the reset OR gate 218. As in the other instances, this impresses a negative pulse on the channel binary reset circuit 220 which will reset all of the channel binaries as previously explained.

In this manner, this interpreter is much more flexible than the other embodiments disclosed and also is much more sophisticated in its performance and in the type of circuitry involved. It has the added advantage of simplifying the program which must be written for the computer in utilizing the information furnished to the computer by the interpreter.

While particular embodiments of the present invention have been illustrated and described, modifications thereof will occur to those skilled in the art. It is to be understood, therefore, that this invention is not to be limited to the particular arrangements and circuits disclosed, and it is intended in the appended claims to cover all modifications within the spirit and scope of this invention.

What is claimed is:

1. An electronic data processing apparatus for interpreting a multiple channel magnetic tape record code into code signals representing the information recorded and also providing instructions acceptable as input requirements of a computer register, said processing apparatus comprising a multiple channel read head, separate amplifying means connected for amplifying record signals in each channel from said read head, means for emitting an ENABLE signal including a two-input AND gate having inputs connected to receive and respond to the concurrent presence of an ON and a READ signal from the computer, separate AND gates in each channel each having three inputs connected respectively to receive and a respond to the concurrent input thereto of a record signal in the respective channel and to said ENABLE signal and to the presence of a computer input register content non-shifting signal for emitting a record output signal in the perspective channel, and timing means including an electronic delay means comprising an AND gate having three inputs connected to receive and respond to the concurrent input thereto of a signal on the occurrence of a record signal in any channel and to said ENABLE signal and to the presence of said computer input register content non-shifting signal for emitting an input register READY signal a predetermined time after said channel record output signal.

2. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected in said system channel circuits; an AND gate means in each channel circuit responsive to concurrent inputs thereto for providing a respective channel record output signal and comprising input means respectively responsive to the presence of a READ command signal from the computer, of a record signal in the respective channel from said read head, and of a non-shifting of content of the computer receiving register to another computer register signal; said channel AND gate last input means including a control AND gate connected for response to the concurrent occurrence of a signal from the computer indicative of a shifting of content from its receiving register to another register and of said computer READ signal for closing said channel AND gate and inhibiting the passage of further data to the computer during such content shifting; magnetic tape transport means for controlling the transport of and transporting tape into reading relation past said read head; and timing means including an electronic delay means responsive to a record signal in any channel for emitting a computer receiving-register READY signal a predetermined time after said channel record output signal.

3. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected in said system channel circuits; an AND gate means in each channel circuit responsive to concurrent inputs thereto for providing a respective channel record output signal and comprising input means respectively responsive to the presence of a READ command signal from the computer, of a record signal in the respective channel from said read head, and of a non-shifting of content of the computer receiving register to another computer register signal; said channel AND gate last input means being responsive to the concurrent occurrence of a signal from the computer indicative of a shifting of content from its receiving register to another register and of said computer READ signal for closing said channel AND gate and inhibiting the passage of further data to the computer during such content shifting; magnetic tape transport means for controlling the transport of and transporting tape into reading relation past said read head at a rate such that consecutive data signals are read spaced in time sequence more than the closed time of said channel AND gate responsive to said computer shifting of register content signal; and timing means including an electronic delay means responsive to a record signal in any channel for emitting a computer receiving-register READY signal a predetermined time after said channel record output signal.

4. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected in said system channel circuits; an AND gate means in each channel circuit responsive to concurrent inputs thereto for providing a respective channel record output signal and comprising input means respectively responsive to the presence of a READ command signal from the computer, of a record signal in the respective channel from said read head, and of a non-shifting of content of the computer receiving register to another computer register signal; said channel AND gate last input means including a control AND gate responsive to the concurrent occurrence of a signal from the computer indicative of a shifting of content from its receiving register to another register and of said computer READ signal for closing said AND gate and inhibiting the passage of further data to the computer during such content shifting; magnetic tape transport means for controlling the transport of and transporting tape into reading relation past said read head at a rate such that consecutive data signals are read spaced in time sequence more than the closed time of said channel AND gate responsive to a computer shifting of register content signal; and timing means including an electronic delay means responsive to a record signal in any channel for emitting a computer receiving-register READY signal a predetermined time after said channel record output signal and connected for terminating and inhibiting said READY signal on receipt of a computer receiving register CONTENT EMPTIED signal.

5. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected in said system channel circuits for reading data records in multiple channels of a magnetic tape; means connected in each channel circuit for amplifying record signals therein from said read head; an AND gate means in each channel circuit responsive to concurrent inputs thereto for providing a respective channel record output signal and comprising input means respectively responsive to the presence of a READ command signal from the computer, of an amplified record signal in the respective channel from said read head, and of a non-shifting of content of the computer receiving register to another computer register signal; said channel AND gate last input means including a control AND gate responsive to the concurrent occurrence of a signal from the computer indicative of a shifting of content from its receiving register to another register and of said computer READ signal for closing said AND gate and inhibiting the passage of further data to the computer during such content shifting; magnetic tape transport means for controlling the transport of and transporting tape into reading relation past said read head; and timing means including an electronic delay means responsive to a record signal in any channel for emitting a computer receiving-register READY signal a predetermined time after said channel record output signal and having another delay means responsive to a signal from said electronic delay means for emitting a signal delayed a further predetermined time for inhibiting said timing means from emitting said READY signal after said further time and for a predetermined time thereafter.

6. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected to said system channel circuits; an AND gate means in each channel responsive to concurrent inputs thereto for providing a respective channel record output and comprising input means respectively connected for response to the presence of a READ (RPT) command signal from the computer, to a record signal in only the respective channel from said read head, and to a non-shifting of content of the computer receiving register to another computer register signal; magnetic tape transport means for transporting and controlling the transport of tape into reading relation past said read head connected for operation responsive to ON and OFF signals and READ and STOP signals from the computer; and timing means comprising an AND gate responsive to concurrent inputs thereto for emitting a computer receiving register READY signal a predetermined time subsequent to a channel record signal in any channel and comprising input means respectively connected for response to the non-shifting of content of the computer receiving register to another register signal, to the concurrent occurrence of an ON signal and an RPT signal from the computer, and to an electronically delayed signal responsive to a data signal in any channel circuit.

7. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits and having a multiple channel magnetic read head connected to said system channel circuits; an AND gate means in each channel responsive to concurrent inputs thereto for providing a respective channel record output and comprising input means respectively connected for response to the presence of a READ (RPT) command signal from the computer, to a record signal in the respective channel from said read head, and to a non-shifting of content of the computer receiving register to another computer register signal; magnetic tape transport means for transporting and controlling the transport of tape into reading relation past said read head; and timing means comprising an AND gate responsive to concurrent inputs thereto for emitting a computer receiving register READY signal a predetermined time subsequent to a channel record signal in any channel and comprising input means respectively connected for response to the non-shifting of content of the computer receiving register to another register signal, to the concurrent occurrence of an ON signal and an RPT signal from the computer, and to an electronically delayed signal responsive to a data signal in any channel circuit.

8. An electronic data processing apparatus for reading and interpreting a multiple channel magnetic tape record into signals representing the data recorded and instructions acceptable as input requirements of a receiving register for a computer, said interpreting processing apparatus comprising an electrical system including multiple similar channel circuits for interpreting the multiple channel record and having a multiple channel magnetic read head connected in said system channel circuits with means for reading each channel on transport of tape in reading relation thereto; an AND gate means in each channel circuit responsive to concurrent inputs thereto for providing a respective channel record output signal and comprising input means respectively responsive to the presence of a READ command signal from the computer, of a record signal in the respective channel from said read head, of a computer ON signal, and of a non-shifting of content of the computer receiving register to another computer register signal; said channel AND gate last input means being responsive to a signal from the computer indicative of a shifting of content from its receiving register to another register for closing said AND gate and inhibiting the passage of further data to the computer during such content shifting; magnetic tape transport means for controlling the transport of and transporting tape into reading relation past said read head at such a rate that consecutive data signals are read spaced in time sequence more than the closed time of said channel AND gate responsive to the computer shifting of register content signal; and timing means including an electronic delay means responsive to a record signal in any channel for emitting a computer receiving-register READY signal a predetermined time after said channel record output signal.

9. An electronic data processing apparatus for reading and interpreting a multiple channel magnetic tape record into signals representing the data recorded and instructions acceptable as input requirements of a receiving register for a computer, said interpreting processing apparatus comprising an electrical system including multiple similar channel circuits for interpreting the multiple channel record and having a multiple channel magnetic read head connected in said system channel circuits; an AND gate means in each channel circuit responsive to concurrent inputs thereto for providing a respective channel record output signal and comprising input means respectively responsive to the presence of a READ command signal from the computer, of a record signal in the respective channel from said read head, and of a non-shifting of content of the computer receiving register to another computer register signal; said channel AND gate last input means being responsive to a signal from the computer indicative of a shifting of content from its receiving register to another register for closing said AND gate and inhibiting the passage of further data to the computer during such content shifting; magnetic tape transport means for controlling the transport of and transporting tape into reading relation past said read head at such a rate that consecutive data signals are read spaced in time sequence more than the closed time of said channel AND gate responsive to said computer shifting of receiving register content signal; and timing means including an electronic delay means responsive to a record signal in any channel for emitting a computer receiving-register READY signal a predetermined time after said channel record output signal.

10. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; means for emitting a signal electronically delayed a predetermined time and responsive to a record signal in any channel; an AND gate means in each channel responsive to concurrent inputs thereto for providing a respective channel record output signal and comprising input means respectively connected for response to a record signal from said read head in only the respective channel, to a non-shifting of content of the computer receiving register to another computer register signal, and to the concurrent presence of a READ (RPT) and an ON command signal from the computer concurrently with said electronically delayed signal; magnetic tape transport means for transporting and controlling the transport of tape into reading relation past said read head; means for emitting another signal delayed a predetermined time subsequent to said first mentioned delayed signal; and timing means comprising an AND gate responsive to concurrent inputs thereto for emitting a computer receiving register READY signal a predetermined time subsequent to said record output signal and comprising input means respectively connected for response to the non-shifting of content of the computer receiving register to another register signal, to the concurrent occurrence of an ON signal and an RPT signal from the computer, and to said another delayed signal.

11. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; an enable AND gate means responsive to concurrent inputs thereto for providing an ENABLE signal and comprising input means respectively connected for response to a READ (RPT) and to an ON signal from the computer; delay means connected for response to a record signal in any channel for emitting a record signal electronically delayed a predetermined time; a delayed enable AND gate means responsive to concurrent inputs thereto for providing a DELAYED ENABLE signal and comprising input means respectively connected for response to said ENABLE signal and to said electronically delayed record signal; channel AND gate means in each channel responsive to concurrent inputs thereto for providing a respective channel record output signal and comprising input means respectively connected for response to said DELAYED ENABLE signal, to a record signal from said read head in only the respective channel, and to a non-shifting of content of the computer receiving register to another computer register signal; magnetic tape transport means for transporting and controlling the transport of tape into reading relation past said read head; means connected for response to an output from said delay means for emitting another signal delayed a predetermined time subsequent to said delayed record signal; and timing means comprising an AND gate means responsive to concurrent inputs thereto for emitting a computer receiving register READY signal a predetermined time subsequent to said record output signal and comprising input means respectively connected for response to the non-shifting of content of the computer receiving register to another register signal, to said ENABLE signal, and to said another delayed signal.

12. An electronic data processing apparatus for interpreting a multiple channel magnetic tape record into signals representing the data recorded and instructions acceptable as input requirements of a computer register, said processing apparatus comprising a multiple channel magnetic read head, separate amplifying means for amplifying record signals in each channel from said read head, a first binary having inputs connectable to the computer for reception of and response to READER ON (RON) and OFF instruction signals from the computer for providing a MOTOR ON (MO) signal in response to a RON signal input, a second binary having inputs connectable to the computer for reception of and response to READ PAPER TAPE (RPT) and HALT PAPER TAPE (HPT) instruction signals from the computer for providing a TAPE DRIVE (TD) signal in response to an RPT signal input and for providing a STOP TAPE (ST) signal in response to an HPT signal, means comprising a two-input AND gate with one input connected to said first binary for reception of said MO signal and the second input connected to said second binary for reception of said TD signal for response to the concurrence of said two input signals for providing an ENABLE signal, a tape transport means connected to receive and respond to the concurrence of said MO and TD signals for transporting magnetic tape in reading relation past said read head, a separate three-input AND gate in each channel each having inputs connected respectively to receive and to respond to the concurrence of a data record signal from its respective one of said channels and to said ENABLE signal and to a computer input register data non-shifting condition signal for emitting an output data record signal in the respective channel, delay means including an OR gate connected to receive and pass a signal on the occurrence of a data record signal in any channel and electronic delay means connected to receive said OR gate signal and emit a corresponding signal delayed a predetermined time, means including a three-input AND gate connected to receive and to respond to the concurrence of three signals one of which is said delayed OR gate signal and the others of which are said ENABLE signal and said computer input register data non-shifting condition signal for emitting a computer input register READY signal.

13. An electronic data processing apparatus for interpreting a multiple channel magnetic tape record into signals representing the data recorded and instructions acceptable as input requirements of a computer register, said processing apparatus comprising a multiple channel magnetic read head, a first binary having inputs connectable to the computer for reception of and response to READER ON (RON) and OFF instruction signals from the computer for providing a MOTOR ON (MO) signal in response to a RON signal input, a second binary having inputs connectable to the computer for reception of and response to READ PAPER TAPE (RPT) and HALT PAPER TAPE (HPT) instruction signals from the computer for providing a TAPE DRIVE (TD) signal in response to an RPT signal input and for providing a STOP TAPE (ST) signal in response to an HPT signal, means comprising a two-input AND gate with one input connected to said first binary for reception of said MO signal and the second input connected to said second binary for reception of said TD signal for response to the concurrence of said two input signals for providing an ENABLE signal, a tape transport means connected to receive and respond to the concurrence of said MO and TD signals for transporting magnetic tape reading relation past said read head, a separate three-input AND gate in each channel each having inputs connected respectively to receive and to respond to the concurrence of a data record signal from its respective one of said channels and to said ENABLE signal and to a computer input register data non-shifting condition signal for emitting an output data record signal in the respective channel, an OR gate connected to receive and pass a signal on the occurrence of a data record signal in any channel, means including a three-input AND gate connected to receive and to respond to the concurrence of three signals one of which is a signal from said OR gate and the others of which are said ENABLE signal and said computer input register data non-shifting condition signal for emitting a computer input register READY signal.

14. An electronic data processing apparatus for reading and interpreting a 1, 2, 4, 8 binary coded decimal code magnetic tape record into signals representing the data recorded and for providing instructions acceptable as input requirements of a receiving register for a computer, said interpreting processing apparatus comprising an electrical system including multiple similar channel circuits and having a multiple channel magnetic read head connected in said system channel circuits; magnetic tape transport means including a motor with a drive capstan and a take-up reel for transporting tape into reading relation past said read head; means for controlling operation of said transport means including means connected for response to an ON command signal from the computer for starting said motor and to an OFF signal from the computer for stopping said motor and means connected for response to a READ signal from the computer for driving said take-up reel and biasing the tape into driving engagement with said capstan and to a STOP signal from the computer for stopping said take-up reel and relieving the tape from said capstan; an AND gate means in each channel circuit responsive to concurrent like inputs thereto for providing a respective channel record output signal; each of said channel AND gates comprising a plurality of input means; one of said input means of each gate being connected to receive a like input in response to the concurrent presence of a READ signal and an ON signal from the computer and of a record signal from said read head in any channel; another of said input means of each gate being connected to receive a like input as a non-shifting of content of the computer receiving register to another computer register signal; a third of said input means of each gate being connected to receive a like input in response to the occurrence of a record signal in its respective channel; the channel AND gate in the digit 2 and digit 4 channel each having a fourth input means connected to receive an unlike input in response to the occurrence of a record signal in the digit 8 channel; the channel AND gate in the digit 8 channel having a fourth and fifth input means respectively connected to receive an unlike input in response to the occurrence of a record signal in the digit 2 channel and digit 4 channel; and timing means including an electronic delay means responsive to a record signal in any channel for emitting a computer receiving-register READY signal a predetermined time after said channel record output signal.

15. An electronic data processing apparatus for reading and interpreting a 1, 2, 4, 8 binary coded decimal code magnetic tape record into signals representing the data recorded and for providing instructions acceptable as input requirements of a receiving register for a computer, said interpreting processing apparatus comprising an electrical system including multiple similar channel circuits and having a multiple channel magnetic read head connected in said system channel circuits; magnetic tape transport means including a motor with a drive capstan and a take-up reel for transporting tape into reading relation past said read head; means for controlling operation of said transport means including means connected for response to an ON command signal from the computer for starting said motor and to an OFF signal from the computer for stopping said motor and means connected for response to a READ signal from the computer for driving said take-up reel and biasing the tape into driving engagement with said capstan and to a STOP signal from the computer for stopping said take-up reel and relieving the tape from said capstan; means connected to respond to the concurrent presence of a READ signal and an ON signal from the computer for emitting an ENABLE signal; an AND gate means in each channel circuit responsive to concurrent like inputs thereto for providing a respective channel record output signal; each of said channel AND gates comprising a plurality of input means, one of said input means of each gate being connected to receive a like input in response to the concurrent preesnce of said ENABLE signal and of a record signal from said read head in any channel; another of said input means of each gate being connected to receive a like input as a non-shifting of content of the computer receiving register to another computer register signal; a third of said input means of each gate being connected to receive a like input in response to the occurrence of a record signal in its respective channels; the channel AND gates in the digit 2 and digit 4 channels each having a fourth input means connected to receive an unlike input in response to the occurrence of a record signal in the digit 8 channel; the channel AND gate in the digit 8 channel having a fourth and fifth input means respectively connected to receive unlike inputs in response to the occurrence of a record signal in the digit 2 channel and digit 4 channel; and timing means for emitting a computer receiving-register READY signal a predetermined time after said channel record output signal comprising a three-input AND gate connected to receive and respond to the concurrence of three like input signals one of which is said non-shifting of content of the computer receiving register signal, another of said like inputs being said ENABLE signal, and an electronic delay means responsive to a record signal in any channel for emitting a delayed record signal impressed as the third like signal on said timing means AND gate.

16. An electronic data processing apparatus for reading and interpreting a 1, 2, 4, 8 binary coded decimal code magnetic tape record into signals representing the data recorded and for providing instructions acceptable as input requirements of a receiving register for a computer, said interpreting processing apparatus comprising an electrical system including multiple similar channel circuits and having a multiple channel magnetic read head connected in said system channel circuits; magnetic tape transport means for transporting tape into reading relation past said read head; means connected to respond to the concurrent presence of a READ signal and an ON signal from the computer for emitting an ENABLE signal; an AND gate means in each channel circuit responsive to concurrent like inputs thereto for providing a respective channel record output signal; each of said channel AND gates comprising a plurality of input means, one of said input means of each gate being connected to receive a like input in response to the concurrent presence of said ENABLE signal and of a record signal from said read head in any channel; another of said input means of each gate being connected to receive a like input as a non-shifting of content of the computer receiving register to another computer register signal; a third of said input means of each gate being connected to receive a like input in response to the occurrence of a record signal in its respective channels; the channel AND gates in the digit 2 and digit 4 channels each having a fourth input means connected to receive an unlike input in response to the occurrence of a record signal in the digit 8 channel; the channel AND gate in the digit 8 channel having a fourth and fifth input means respectively connected to receive unlike inputs in response to the occurrence of a record signal in the digit 2 channel and digit 4 channel; and timing means for emitting a computer receiving-register READY signal a predetermined time after said channel record output signal comprising an three-input AND gate connected to receive and respond to the concurrence of three like input signals one of which is said non-shifting of content of the computer receiving register signals, another of said like inputs being said ENABLE signal, and an electronic delay means responsive to a record signals in any channel for emitting a delayed record signal impressed as the third like signal on said timing means AND gate.

17. An electronic data processing apparatus for interpreting a multiple channel magnetic tape record into signals representing the information recorded and instructions acceptable as input requirements of a computer register comprising a multiple channel read head; separate amplifying means connected for receiving amplifying record signals in each channel from said read head; separate AND gates in each channel each having three inputs connected respectively to receive and to respond to the concurrence of three input signals consisting of a respective channel record signal and an ENABLE signal and a computer register non-shifting of information condition signal for emitting a record signal in the respective channel; means including an AND gate having three inputs connected to receive and to respond to the concurrence of three signals one of which is a signal on the occurrence of a record signal in any channel and the others of which are said ENABLE signal and said computer register non-shifting of information condition signal for emitting a computer input register READY signal; means for providing said ENABLE signal comprising a two-input AND gate, a first bistable multivibrator having an output connected to one input of said two-input AND gate and inputs connected to the computer for reception of and response to ON and OFF instruction signals from the computer for providing a MOTOR ON (MO) signal to said AND gate responsive to an ON signal on said first bistable multivibrator; a second bistable multivibrator having an output connected to the other input of said two-input AND gate and inputs connected to the computer for reception of and response to READ PAPER TAPE (RPT) and HALT PAPER TAPE (HPT) instruction signals from the computer for providing a TAPE DRIVE (TD) signal to said two-input AND gate responsive to an RPT signal on said second bistable multivibrator and a STOP TAPE (ST) signal responsive to an HPT signal on said second bistable multivibrator; magnetic tape transport means including a tape driving capstan and a pressure roller for pressure biasing tape into driving engagement with said capstan with a take-up reel and a brake therefor; and means connected for reception of and response to a TD signal from said second bistable multivibrator for providing a release of said brake and an application of said pressure roller; said latter means being also responsive to an ST signal from said second bistable multivibrator for providing for release of pressure on tape by said pressure roller and for application of said take-up reel brake.

18. An electronic data processing apparatus for reading and interpreting a multiple channel magnetic tape record into signals representing the data recorded and instructions acceptable as input requirements of a receiving register of a computer, said interpreting processing apparatus comprising an electrical system including a multiple similar channel circuits for interpreting the multiple channel record and having a multiple channel magnetic read head connected to said system channel circuits; separate amplifying means connected for amplifying record signals in each channel of said read head; a binary in each channel connected to receive a record signal from its respective channel amplifier and emitting a corresponding output signal; an enable AND gate means responsive to concurrent inputs thereto for providing an ENABLE signal and comprising input means respectively connected for response to the concurrent presence of a READ (RPT) and an ON signal from the computer; delay means connected for response to a record signal in any channel for emitting a record signal electronically delayed a predetermined time; a delayed enable AND gate means responsive to concurrent inputs thereto for providing a DELAYED ENABLE signal and comprising input means respectively connected for response to said ENABLE signal and to the presence of said electronically delayed record signal; channel AND gate means in each channel responsive to concurrent inputs thereto for providing a respective channel record output signal and comprising input means respectively connected for response to said DELAYED ENABLE signal, to a record signal from said read head in only the respective channel, and to a non-shifting of content of the computer receiving register to another computer register signal; said channel AND gate last input means being responsive to a signal from the computer indicative of a shifting of content from its receiving register to another register for closing said channel AND gate and inhibiting the passage of further data to the computer during such content shifting; magnetic tape transport means for transporting and controlling the transport of tape into reading relation past said read head at a rate such that consecutive data signals are read spaced in time sequence more that the closed time of said channel AND gate means responsive to the computer shifting of receiving register content signal; means connected for response to an output from said delay means for emitting another signal delayed a predetermined time subsequent to said delayed record signal; and timing means comprising an AND gate means responsive to concurrent inputs thereto for emitting a computer receiving register READY signal a predetermined time subsequent to said record output signal and comprising input means respectively connected for response to the non-shifting of content of the computer receiving register to another register signal, to said ENABLE signal, and to said another delayed signal.

19. An electronic data processing apparatus for reading and interpreting a multiple channel magnetic tape record into signals representing the data recorded and instructions acceptable as input requirements of a receiving register of a computer comprising an electrical system including multiple similar channel circuits for interpreting the multiple channel record and having a multiple channel magnetic read head connected to said system channel circuits; separate amplifying means connected for amplifying record signals in each channel of said read head; a binary in each channel connected to receive a record signal from its respective channel amplifier and and emitting a corresponding output signal; an enable AND gate means responsive to concurrent inputs thereto for providing an ENABLE signal and comprising input means respectively connected for response to a READ (RPT) and to an ON signal from the computer; a delay means connected for response to a record signal in any channel for emitting a record signal electronically delayed a predetermined time; a delayed enable AND gate means responsive to concurrent inputs thereto for providing a DELAYED ENABLE signal and comprising input means respectively connected for response to said ENABLE signal and to said electronically delayed record signal; channel AND gate means in each channel responsive to concurrent inputs thereto for providing a respective channel record output signal and comprising input means respectively connected for response to said DELAYED ENABLE signal, to a record signal from said read head in only respective channel, and to a non-shifting of content of the computer receiving register to another computer register signal; said channel AND gate last input means being responsive to a signal from the computer indicative of a shifting of content from its received register to another register for closing said channel AND gate and inhibiting the passage of further data to the computer during such content shifting; magnetic tape transport means for transporting and controlling the transport of tape into reading relation past said read head at a rate such that consecutive data signals are read spaced in time sequence more than the closed time of said channel AND gate means responsive to the computer shifting of register content signal; means connected for response to an output from said delay means for emitting another signal delayed a predetermined time subsequent to said delayed record signal; and timing means comprising an AND gate means responsive to concurrent inputs thereto for emitting a computer receiving register READY signal a predetermined time subsequent to said record output signal and comprising input means respectively connected for response to the non-shifting of content of the computer receiving register to another register signal, to said ENABLE signal, and to said another delayed signal.

20. An electronic data processing apapratus for interpreting a multiple channel magnetic tape record into signals respresenting the data recorded and instructions acceptable as input requirements of a computer, said processing apparatus comprising a multiple channel read head, separate amplifying means in each channel connected for receiving record signals from said read head and for amplifying such signals, a separate AND gate in each channel, each of said separate AND gates having three inputs connected respectively to receive a respective channel data record signal and an ENABLE signal and a computer input register non-shifting condition signal and connected so as to respond to the concurrence of said three input signals for emitting an output data record signal in the respective channel, means including an AND gate for emitting a computer input register READY signal, said READY signal AND gate means having three inputs connected to receive three signals one of which is a signal on the occurrence of a record signal in any channel and the others of which are said ENABLE signal and said computer input register non-shifting condition signal and connected to respond to the concurrence of said three signals for emitting said READY signal, means for providing said ENABLE signal comprising a two-input AND gate, a first binary having an output connected to one input of said two-input AND gate, a first binary having an output connected to one input of said two-input AND gate and having inputs connected to the computer for reception of and response to READER ON (RON) and OFF instruction signals from the computer for providing an ENERGIZING (E) signal to said two-input AND gate responsive to an RON signal on said first binary and a DEENERGIZING (DE) signal responsive to an OFF signal input to said first binary, a second binary having an output connected to the other input of said two-input AND gate and having inputs connected to the comuter for reception of and response to READ PAPER TAPE (RPT) and HALT PAPER TAPE (HPT) instruction signals from the computer for providing a second ENERGIZING (E) signal to said two-input AND gate responsive to an RPT signal on said second binary and a second DEENERGIZING (DE) signal responsive to an HPT signal input to said second binary, magnetic tape transport means for carrying tape in reading relation past said read head including a motor having a tape driving capstan and a brake therefor, a pressure roller for pressure biasing tape into driving engagement with said capstan, means connected for response to an E signal from said first binary for energizing said motor and for response to a DE signal from said first binary for de-energizing said motor, and means connected for reception of and response to an E signal from said second binary for providing a release of said capstan brake and an application of tape biasing pressure by said pressure roller, said latter means being also responsive to a DE signal from said second binary for providing for release of pressure on tape by said pressure roller and for application of said capstan brake.

21. An electronic data processing apparatus for interpreting a multiple channel magnetic tape record into signals representing the data recorded and instructions acceptable as input requirements of a computer, said processing apparatus comprising a multiple channel read head, a separate AND gate in each channel, each of said separate AND gates having three inputs connected respectively to receive a respective channel data record signal and an ENABLE signal and computer input register non-shifting condition signal and connected so as to respond to the concurrence of said three input signals for emitting an output data record signal in the respective channel, an OR gate connected for receiving input signals from all channels of said read head and transmitting a signal on the occurrence of a data record signal in any channel means including a three-input AND gate for emitting a computer input register READY signal and connected to receive three signals one of which is a signal transmitted by said OR gate and the others of which are said ENABLE signal and said computer input register non-shifting condition signal and connected to respond to the concurrence of said three signals for emitting said READY signal, means for providing said ENABLE signal comprising a two-input AND gate and a first binary having an output connected to one input of said two-input AND gate and having inputs connected to the computer for reception of and response to READER ON (RON) and OFF instruction signals from the computer for providing an ENERGIZING (E) signal to said two-input AND gate responsive to an RON signal on said first binary and a DEENERGIZING (DE) signal responsive to an OFF signal input to said first binary, a second binary having an output connected to the other input of said two-input AND gate and having inputs connected to the computer for reception of and response to READ PAPER TAPE (RPT) and HALT PAPER TAPE (HPT) instruction signals from the computer for providing a second ENERGIZING (E) signal to said two-input AND gate responsive to an RPT signal on said second binary and a second DEENERGIZING (DE) signal responsive to an HPT signal input to said second binary, magnetic tape transport means for carrying tape in reading relation past said read head including a tape driving capstan and a brake therefor, a pressure roller for pressure biasing tape into driving engagement with said capstan, and means connected for reception of and response to an E signal from said second binary for providing a release of said capstan brake and an application of tape biasing pressure by said pressure roller, said latter means being also responsive to a DE signal from said second binary for providing for release of pressure on tape by said pressure roller and for application of said capstan brake.

22. An electronic data processing apparatus for interpreting a multiple channel magnetic tape record into signals representing the data recorded and instructions acceptable as input requirements of a computer register, said processing apparatus comprising a multiple channel magnetic read head, a first binary having inputs connectable to the computer for reception of and response to READER ON (RON) and OFF instruction signals from the computer for providing a MOTOR ON (MO) signal in response to a RON signal input, a second binary having inputs connectable to the computer for reception of and response to READ PAPER TAPE (RPT) and HALT PAPER TAPE (HPT) instruction signals from the computer for providing a TAPE DRIVE (TD) signal in response to an RPT signal input and for providing a STOP TAPE (ST) signal in response to an HPT signal, means comprising a two-input AND gate with one input connected to said first binary for reception of said MO signal and the second input connected to said second binary for reception of said TD signal for response to the concurrence of said two input signals for providing an ENABLE signal, a tape transport means connected to receive and respond to the concurrence of said MO and TD signals for transporting magnetic tape in reading relation past said read head, said transport means comprising a drive motor with a tape driving capstan and a take-up reel connected for drive by said motor and including a pressure roller for biasing tape into driving engagement with said capstan and a brake for said take-up reel; and means connected for reception of and response to a TD signal from said second binary for providing a release of said take-up reel brake and an appliction of said pressure roller, said latter means being also responsive to an ST signal from said second binary for providing release of said take-up reel brake and an application of said plication of said take-up reel brake; a separate three-input AND gate in each channel each havig inputs connected respectively to receive and to respond to the concurrence of a data record signal from its respective one of said channels and to said ENABLE signal and to a computer input register data non-shifting condition signal for emitting an output data record signal in the respective channel, an OR gate connected to receive and pass a signal on the occurrence of a data record signal in any channel, means including a three-input AND gate connected to receive and to respond to the concurrence of three signals one of which is a signal from said OR gate and the others of which are said ENABLE signal and said computer input register data non-shifting condition signal for emitting a computer input register READY signal.

23. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; means for emitting a signal electronically delayed a predetermined time and responsive to a record signal in any channel; and AND gate means in each channel responsive to concurrent inputs thereto for providing a respective channel record output signal and comprising input means respectively connected for response to a record signal from said read head in only the respective channel, and to a non-shifting of content of the computer receiving register to another computer register signal, and to the concurrent presence of a READ (RPT) and an ON command signal from the computer concurrently with said electronically delayed signal; magnetic tape transport means for transporting and controlling the transport of tape into reading relation past said read head; said transport means comprising a tape driving capstan and a take-up reel connected for drive by said motor and a pressure roller for biasing tape into driving engagement with said capstan and a brake for said take-up reel; a first binary having inputs connected to the computer for reception of and response to READER ON (RON) and OFF instruction signals from the computer for providing a MOTOR ON (MO) signal to said motor responsive to an RON signal on said first binary, a second binary having an output connected to the computer for reception of and response to READ PAPER TAPE (RPT) and HALT PAPER TAPE (HPT) instruction signals from the computer for providing a TAPE DRIVE (TD) signal responsive to an RPT signal and a STOP TAPE (ST) signal responsive to an HPT signal; and means connected for reception of and response to a TD signal from said second binary for providing a release of said take-up reel brake and an application of said pressure roller, said latter means being also responsive to an ST signal from said second binary for providing release of pressure on tape by said pressure roller and application of said take-up reel brake; means for emitting another signal delayed a predetermined time subsequent to said first mentioned delayed signal; and timing means comprising an AND gate responsive to concurrent inputs thereto for emitting a computer receiving register READY signal a predetermined time subsequent to said record output signal and comprising input means respectively connected for response to the non-shifting of content of the computer receiving register to another register signal, to the concurrent occurrence of an ON signal and an RPT signal from the computer, and to said another delayed signal.

24. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; an enable two-input AND gate means responsive to concurrent inputs thereto for providing an ENABLE signal and comprising input means respectively connected for response to the concurrent presence of a READ (RPT) and to an ON signal from the computer; delay means connected for response to a record signal in any channel for emitting a record signal electronically delayed a predetermined time; a delayed enable AND gate means responsive to concurrent inputs thereto for providing an DELAYED ENABLE signal and comprising input means respectively connected for response to said ENABLE signal and to said electronically delayed record signal; channel AND gate means in each channel responsive to concurrent inputs thereto for providing a respective channel record output signal and comprising input means respectively connected for response to said DELAYED ENABLE signals, to a record signal from said read head in only the respective channel, and to non-shifting of content of the computer receiving to another computer register signal; magnetic tape transport means including a drive motor for transporting and controlling the transport of tape into reading relation past said read head; said transport means comprising a tape driving capstan and a take-up reel connected for drive by said motor and a pressure roller for biasing tape into driving engagement with said capstan and a brake for said take-up reel; a first binary having one output connected to one input of said enable two-input AND gate and inputs connected to the computer for reception of and response to READER ON (RON) and OFF instruction signals from the computer for providing a MOTOR ON (MO) signal to said enable two-input AND gate responsive to a RON signal on said first binary, a second binary having an output connected to the computer for reception of and response to READ PAPER TAPE (RPT) and HALT PAPER TAPE (HPT) instruction signals from the computer for providing a TAPE DRIVE (TD) signal to enable said two-input AND gate responsive to an RPT signal on said second binary and a STOP TAPE (ST) signal responsive to an HPT signal on said second binary; and means connected for reception of and response to a TD signal from said second binary for providing a release of said take-up reel brake and an application of said pressure roller, said latter means being also responsive to an ST signal from said second binary for providing release of pressure on tape by said pressure roller and application of said take-up reel brake; means connected for response to an output from said delay means for emitting another signal delayed a predetermined time subsequent to said delayed record signal; and timing means comprising an AND gate means responsive to concurrent inputs thereto for emitting a computer receiving register READY signal a predetermined time subsequent to said record output signal and comprising input means respectively connected for response to the non-shifting of content of the computer receiving register to another register signal, to said ENABLE signal, and to said another delayed signal.

25. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; an enable AND gate means responsive to concurrent inputs thereto for providing an ENABLE signal and comprising input means respectively connected for response to the concurrent presence of a READ (RPT) and to an ON signal from the computer; a delay means connected for response to a record signal in any channel for emitting a delayed record signal electronically delayed a predetermined time; a delayed enable AND gate means for providing a DELAYED ENABLE signal and comprising input means connected for response to concurrent inputs thereto of said ENABLE signal and said electronically delayed record signal; channel AND gate means in each channel for providing a respective channel record output signal and comprising input means connected for response to concurrent inputs thereto of said DELAYED ENABLE signal, a record signal from said read head in only the respective channel, and a non-shifting of content of the computer receiving register to another computer register signal; said channel AND gate last input means being responsive to a signal from the computer indicative of a shifting of content from its received register to another register for closing said channel AND gate and inhibiting the passage of further data to the computer during such content shifting; magnetic tape transport means including a drive motor for transporting and controlling the transport of tape into reading relation past said read head at a rate such that consecutive data signals are read spaced in time sequence more than the closed time of said channel AND gate means responsive to the computer shifting of register content signal; said transport means comprising a tape driving capstan and a take-up reel connected for drive by said motor and a pressure roller for biasing tape into driving engagement with said capstan and a brake for said take-up reel; a first binary having one output connected to one input of said two-input AND gate and inputs connected to the computer for reception of and response to READER ON (RON) and OFF instruction signals from the computer for providing a MOTOR ON (MO) signal to said two-input AND gate responsive to an RON signal on said first binary, a second binary having an output connected to the other input of said two-input AND gate and inputs connected to the computer for reception of and response to READ PAPER TAPE (RPT) and HALT PAPER TAPE (HPT) instruction signals from the computer for providing a TAPE DRIVE (TD) signal to said two-input AND gate responsive to and RPT on said second binary and a STOP TAPE (ST) signal responsive to an HPT signal on said second binary; and means connected for reception of and response to a TD signal from said second binary for providing a release of said take-up reel brake and an application of said pressure roller; said latter means being also responsive to an ST signal from said second binary for providing release of pressure on tape by said pressure roller and application of said take-up reel brake; and timing means comprising an AND gate means for emitting a computer receiving register READY signal a predetermined time subsequent to said record output signal and comprising input means connected for response to concurrent inputs thereto of the non-shifting of content of the computer receiving register to another register signal, to said ENABLE signal, and to an output from said delay means.

26. An electronic data processing apparatus for reading and interpreting a multiple channel magnetic tape record into signals representing the data recorded and instructions acceptable as input requirements of a receiving register of a computer comprising an electrical system including a multiple similar channel circuits for interpreting the multiple channel record and having a multiple channel magnetic read head connected to said system channel circuits; separate amplifying means connected for amplifying record signals in each channel of said read head; a binary in each channel connected to receive a record signal from its respective channel amplifier and emitting a corresponding output signal; an enable two-input AND gate means responsive to concurrent inputs thereto for providing an ENABLE signal and comprising input means respectively connected for response to the concurrent presence of a READ (RPT) and to an ON signal from the computer; delay means connected for response to a record signal in any channel for emitting a record signal electronically delayed a predetermined time; a delayed enable AND gate means responsive to concurrent inputs thereto for providing a DELAYED ENABLE signal and comprising input means respectively connected for response to said ENABLE signal and to the presence of said electronically delayed record signal; channel AND gate means in each channel responsive to concurrent inputs thereto for providing a respective channel record output signal and comprising input means respectively connected for response to said DELAYED ENABLE signal, to a record signal from said read head in only the respective channel, and to a non-shifting of content of the computer receiving register to another computer register signal; said channel AND gate last input means being responsive to a signal from the computer indicative of a shifting of content from its receiving register to another register for closing said channel AND gate and inhibiting the passage of further data to the computer during such content shifting; magnetic tape transport means for transporting and controlling the transport of tape into reading relation past said read head at a rate such that consecutive data signals are read spaced in time sequence more than the closed time of said channel AND gate means responsive to the computer shifting of receiving register content signal; said transport means comprising a drive motor with a tape driving capstan and a take-up reel connected for drive by said motor and including a pressure roller for biasing tape into driving engagement with said capstan and a brake for said take-up reel; a first binary having one output connected to one input of said enable two-input AND gate and inputs connected to the computer for reception of and response to READER ON (RON) and OFF instruction signals from the computer for providing a MOTOR ON (MO) signal to said enable two-input AND gate responsive to a RON signal on said first binary, a second binary having an output connected to the computer for reception of and response to READ PAPER TAPE (RPT) and HALT PAPER TAPE (HPT) instruction signals from the computer for providing a TAPE DRIVE (TD) signal to said enable two-input AND gate responsive to an RPT signal on said second binary and a STOP TAPE (ST) signal responsive to an HPT signal on said second binary; and means connected for reception of and response to a TD signal from said second binary for providing a release of said take-up reel brake and an application of said pressure roller, said latter means being also responsive to an ST signal from said second binary for providing release of pressure on tape by said pressure roller and application of said take-up reel brake; means connected for response to an output from said delay means for emitting another signal delayed a predetermined time subsequent to said delayed record signal; and timing means comprising an AND gate means responsive to concurrent inputs thereto for emitting a computer receiving register READY signal a predetermined time subsequent to said record output signal and comprising input means respectively connected for response to the non-shifting of content of the computer receiving register to another register signal, to said ENABLE signal, and to said another delayed signal.

27. An electronic data processing apparatus for reading and interpreting a multiple channel magnetic tape record into signals representing the data recorded and instructions acceptable as input requirements of a receiving register of a computer, said interpreting processing apparatus comprising an electrical system including multiple similar channel circuits for interpreting the multiple channel record and having a multiple channel magnetic read head connected to said system channel circuits; separate amplifying means connected for amplifying record signals in each channel of said read head; a binary in each channel connected to receive a record signal from its respective channel amplifier and emitting a corresponding amplified output signal; an enable AND gate means responsive to concurrent inputs thereto for providing an ENABLE signal and comprising input means respectively connected for response to the concurrent presence of a READ (RPT) and to an ON signal from the computer; a delay means connected for response to a record signal in any channel for emitting a delayed record signal electronically delayed a predetermined time; a delayed enable AND gate means for providing a DELAYED ENABLE signal and comprising input means connected for response to concurrent inputs thereto of said ENABLE signal and said electronically delayed record signal; channel AND gate means in each channel for providing a respective channel record output signal and comprising input means connected for response to concurrent inputs thereto of said DELAYED ENABLE signal, a record signal from said read head in only the respective channel, and a non-shifting of content of the computer receiving register to another computer register signal; said channel AND gate last input means being responsive to a signal from the computer indicative of a shifting of content from its received register to another register for closing said channel AND gate and inhibiting the passage of further data to the computer during such content shifting; magnetic tape transport means including a drive motor for transporting and controlling the transport of tape into reading relation past said read head at a rate such that consecutive data signals are read spaced in time sequence more than the closed time of said channel AND gate means responsive to the computer shifting of register content signal; said transport means comprising a tape driving capstan and a take-up reel connected for drive by said motor and a pressure roller for biasing tape into driving engagement with said capstan and a brake for said take-up reel; a first binary having one ouput connected to one input of said two-input AND gate and inputs connected to the computer for reception of and response to READER ON (RON) and OFF instruction signals from the computer for providing a MOTOR ON (MO) signal to said two-input AND gate responsive to an RON signal on said first binary; a second binary having an output connected to the other input of said two-input AND gate and inputs connected to the computer for reception of and response to READ PAPER TAPE (RPT) and HALT PAPER TAPE (HPT) instruction signals from the computer for providing a TAPE DRIVE (TD) signal to said two-input AND gate responsive to an RPT signal on said second binary and a STOP TAPE (ST) signal responsive to an HPT signal on said second binary; and means connected for reception of and response to a TD signal from said second binary for providing a release of said take-up reel brake and an application of said pressure roller; said latter means being also responsive to an ST signal from said second binary for providing release of pressure on tape by said pressure roller and application of said take-up reel brake; means connected for response to an output from said delay means for emitting another signal delayed a predetermined time subsequent to said delayed record signal; and timing means comprising an AND gate means for emitting a computer receiving register READY signal a predetermined time subsequent to said record output signal and comprising input means connected for response to concurrent inputs thereto for the non-shifting of content of the computer receiving register to another register signal, said ENABLE signal, and said another delayed signal.

References Cited

UNITED STATES PATENTS

| | | | |
|---|---|---|---|
| 3,209,331 | 9/1965 | Arnold et al. | 340—172.5 |
| 3,131,377 | 4/1964 | Grondin | 340—172.5 |
| 3,123,810 | 3/1964 | Strauch et al. | 340—174.1 |
| 3,064,239 | 11/1962 | Svigals et al. | 340—172.5 |
| 2,984,826 | 5/1961 | Reed | 340—174.1 |
| 2,977,578 | 3/1961 | Daniels et al. | 340—174.1 |
| 2,872,666 | 2/1959 | Greenhalgh | 340—174 |
| 2,708,267 | 5/1955 | Weidenhammer | 340—174 |

PAUL J. HENON, *Primary Examiner.*

G. D. SHAW, *Assistant Examiner.*